(12) United States Patent
Jackson

(10) Patent No.: US 9,884,263 B1
(45) Date of Patent: Feb. 6, 2018

(54) USER IDENTIFICATION AND TRACKING SYSTEM FOR ARTIFICIAL CAVE OBSTACLE COURSE

(71) Applicant: David Alexander Jackson, Manitou Springs, CO (US)

(72) Inventor: David Alexander Jackson, Manitou Springs, CO (US)

( * ) Notice: Subject to any disclaimer, the term of this patent is extended or adjusted under 35 U.S.C. 154(b) by 0 days.

(21) Appl. No.: 15/200,277

(22) Filed: Jul. 1, 2016

Related U.S. Application Data

(63) Continuation-in-part of application No. 14/594,070, filed on Jan. 9, 2015, now Pat. No. 9,399,178.

(60) Provisional application No. 61/964,751, filed on Jan. 13, 2014.

(51) Int. Cl.
| | |
|---|---|
| *A63J 11/00* | (2006.01) |
| *G08B 7/06* | (2006.01) |
| *G08B 5/36* | (2006.01) |
| *G01V 8/20* | (2006.01) |
| *G01J 5/00* | (2006.01) |
| *G06F 1/32* | (2006.01) |
| *G08B 1/00* | (2006.01) |

(52) U.S. Cl.
CPC ............ *A63J 11/00* (2013.01); *G01J 5/0025* (2013.01); *G01V 8/20* (2013.01); *G06F 1/3231* (2013.01); *G08B 5/36* (2013.01); *G08B 7/066* (2013.01)

(58) Field of Classification Search
CPC . A63J 11/00; G08B 1/00; G08B 21/22; B60C 1/00; B60C 1/48

USPC ................. 472/62, 136; 340/932.2
See application file for complete search history.

(56) References Cited

U.S. PATENT DOCUMENTS

| | | | | | |
|---|---|---|---|---|---|
| 5,473,318 | A | * | 12/1995 | Martel | G07C 9/00015 340/12.3 |
| 6,522,078 | B1 | * | 2/2003 | Okamoto | H05B 37/0272 307/116 |
| 8,574,085 | B1 | * | 11/2013 | Jackson | A63J 11/00 472/136 |
| 2012/0274482 | A1 | * | 11/2012 | Chen | G08G 1/144 340/932.2 |
| 2015/0123547 | A1 | * | 5/2015 | Fushimi | A47F 3/001 315/155 |

* cited by examiner

Primary Examiner — Kien Nguyen

(57) ABSTRACT

An artificial cave has various features that resemble speleothems (e.g., stalactites, stalagmites, etc.) found in real subterranean caves. Human users may pass through the artificial cave, with each user wearing a wearable transceiver that broadcasts a signal code unique to that user. Fixed transceivers throughout the cave can detect and identify any user who is sufficiently close to that fixed transceiver. Other components of the system collect user identification information from the fixed transceivers for any of several possible purposes (e.g., identifying which user was probably responsible for inappropriate interaction with a speleothem that is adjacent to a given fixed transceiver, where all of the various user of the cave are currently located in the cave, etc.). A count of users currently in the artificial cave passageway may be maintained and used for a number of purposes. Similarly, human detectors may be employed near the system and/or in the artificial cave passage for any of several different purposes.

19 Claims, 12 Drawing Sheets

USER IDENTIFICATION AND TRACKING SYSTEM FOR ARTIFICIAL CAVE OBSTACLE COURSE

CROSS-REFERENCE TO RELATED APPLICATIONS

This application is a continuation-in-part of application Ser. No. 14/594,070, filed Jan. 9, 2015, which claims the benefit of Provisional Application 61/964,751, filed Jan. 13, 2014, both of which are hereby incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Obstacle courses of the type shown in U.S. Pat. No. 8,574,085 are currently in use for teaching participants about the fragile nature of real cave environments. Users of the current systems include search and rescue personnel, caving enthusiasts, and children and adults from the general public. When these users travel through the obstacle courses, they encounter artificial cave formations, also known as speleothems. When a user touches or otherwise inappropriately interacts with a speleothem, the user is considered to have "damaged" that speleothem. The "damaging" interaction between the user and the speleothem is detected by electronic sensors. These sensors may convey "damage" information to a system that displays maps showing all of the "damages" that have occurred, along with aggregate data such as (1) the total number of "damages" that have occurred in the current session and (2) the elapsed time of the current session. U.S. Pat. No. 8,574,085 is hereby incorporated by reference herein in its entirety.

Although the current obstacle courses have been very successful, there are a number of respects in which the current systems might be improved. For example, users may enter the existing obstacle courses singly or in groups, but in the courses currently in use there is no provision for determining which user within a group "damaged" a given formation. Further, there are no provisions for determining the location of each user within the course, or the progress of each user through the course. Additionally, in the systems currently in use, the users wear protective helmets equipped with electric lights, and there is no provision in the existing courses for the lights to be turned on and off automatically when the users enter and exit the course. There is also no provision for automatically detecting whether each user is wearing the proper equipment (including the helmet with light), and whether that equipment is functioning properly. Because of the above-described aspects of the existing courses, and because of other possible considerations not stated, there is room for improvement to the systems currently in use in the areas of user identification and tracking.

SUMMARY OF THE INVENTION

This invention provides an electronic system for locating, identifying, and tracking human users in an obstacle course designed to look like a natural cave environment. A prior invention (U.S. Pat. No. 8,574,085) by the same inventor relates to an obstacle course which contains artificial cave formations (speleothems), as well as sensors (e.g., electromechanical sensors) for the detection of human interaction with the artificial formations. The present invention provides an electronic tracking system comprising transceivers worn by the human users (hereafter wearable transceivers), as well as transceivers located throughout the obstacle course and possibly also at the entrances and exits of the course (hereafter fixed transceivers). Communication from the wearable transceivers to the fixed transceivers may convey information about the identity and location of users in the artificial cave obstacle course, and possibly also about the status of the wearable transceivers and other wearable electronics. For example, information about the amount of charge remaining in the batteries of the users' wearable electronics may be communicated, along with the on/off status of the users' electric lights. Communication from the fixed transceivers to the wearable transceivers may convey information making possible remote control of other wearable electronic hardware (e.g., an electric light worn by a user may be turned on and off using information conveyed from the fixed to the wearable transceivers). Communication among the fixed transceivers (and possibly other electronic systems) may convey information about the movement (or lack thereof) of the users, and may also allow for the identification of the user who was closest to a given location at the time of a specific event (e.g., when a user interacts with an artificial speleothem as detected by sensors as in U.S. Pat. No. 8,574,085, the present invention may allow for the determination of which of multiple users had the interaction with the artificial speleothem). Further, this invention provides electronic equipment for interfacing with the sensors and other electronic apparatus of the types shown in U.S. Pat. No. 8,574,085 and with the users and operators of the obstacle course.

Certain other possible features of the invention relate to apparatus and methods for counting users entering and exiting an artificial cave passage for such purposes as keeping the number of users currently in the passage at any given time at or below a predetermined desired maximum number of simultaneous users.

Still other possible features of the invention relate to apparatus and methods for monitoring human presence and/or motion (e.g., human operator presence and/or motion in an area outside the actual artificial cave passageway that operators typically enter to operate the cave, and/or human user presence and/or motion inside the artificial cave passageway) to automatically reduce electrical power consumption by at least some elements of the artificial cave system after there has been no such human presence and/or motion for at least a certain predetermined time interval.

Yet other possible features of the invention involve combining certain aspects of the two immediately preceding paragraphs, for example, so that the immediately above-mentioned power consumption reduction is not allowed to occur unless the net count of users (mentioned two paragraphs earlier) is zero when power consumption reduction would otherwise be called for.

Further features of the invention, its nature and various advantages will be more apparent from the accompanying drawings and the following detailed description.

DETAILED DESCRIPTION OF THE INVENTION

Figure 1:
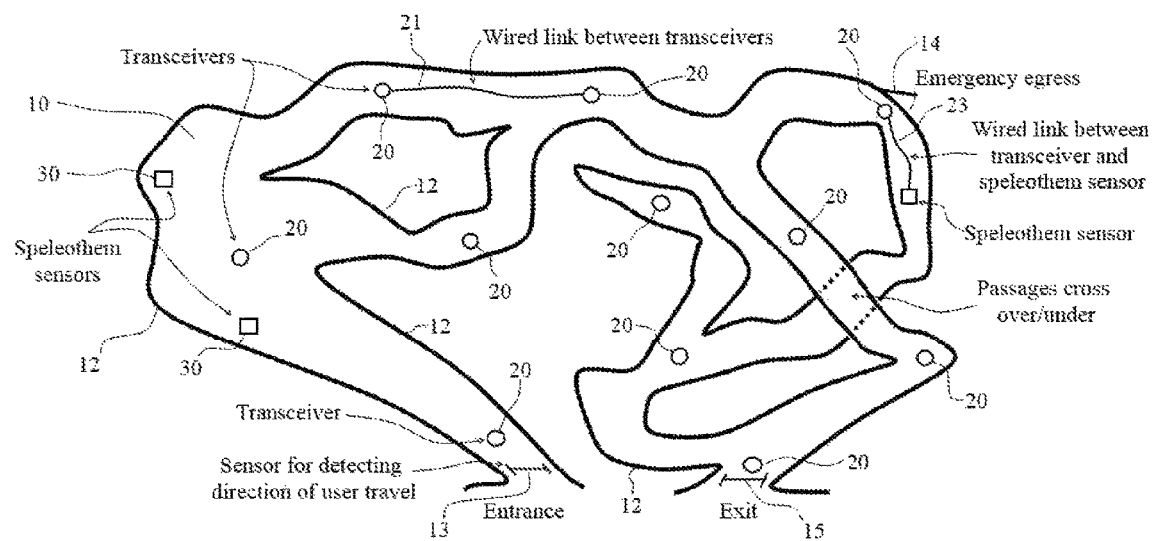
FIG. 1 is a simplified plan view of an illustrative embodiment of a cave obstacle course with fixed transceivers in accordance with certain possible aspects of the present invention.

Electronic transceivers 20 (see, e.g., FIG. 1) are placed throughout an artificial cave obstacle course or passage 10 fashioned of hollow, three-dimensional shapes 12, such as, but not limited to, rectangular and triangular prisms and cylinders, connected to form the passage 10 through which one or more humans ("users") can move, either with or without various types of equipment. As in U.S. Pat. No. 8,574,085, at least the interior of passage 10 is preferably constructed and otherwise made to resemble a natural subterranean cave environment. As in most natural caves, the construction of passage 10 is typically such as to require users to crawl through at least some portions of the passage in order to traverse (pass through) the passage.

The multiple electronic transceivers 20 in the course 10 (hereafter "fixed transceivers") preferably communicate wirelessly with additional electronic transceivers 50 (see, e.g., FIG. 2) worn by the human users of the course (hereafter "wearable transceivers"). Each such human user typically wears one wearable transceiver 50, which can be used (e.g., by any fixed transceiver 20) to uniquely identify the user wearing that wearable transceiver 50 as will be explained in more detail below. The wireless communication between the fixed 20 and wearable 50 transceivers may be accomplished via any suitable medium, including, but not limited to, radio waves, optical waves, or acoustic waves.

Each of the multiple wearable transceivers 50 preferably contains a unique identifying code, such as a number, which allows the fixed transceivers 20 to determine from which of the wearable transceivers a particular communication originated. The identifying code may be programmed into the transceiver 50 via any suitable means, such as, but not limited to, an array of switches, a coded piece of hardware plugged into the transceiver (hereafter "a dongle"), or a wired or wireless link to a programmer. Further, the identifying code may be fixed or may be reassigned by the system. Each fixed transceiver 20 is also preferably assigned a unique identifying code, such as a number, which allows a central electronic system 100 (see, e.g., FIG. 3) to determine from which of the fixed transceivers 20 a particular communication has emanated. Each fixed transceiver 20 may be programmed with its unique identifier via any suitable means, including an array of switches, a dongle, or a wired or wireless link (see, e.g., dongles 22 in FIG. 3).

The fixed transceivers 20 can be placed at any interval or randomly throughout the course 10, and may be affixed to the course in such a way that they can be relocated. FIG. 1 shows one illustrative embodiment of the placement of fixed transceivers (represented by the small circles 20) in an obstacle course (the area 10 between the heavy, longitudinally-extended lines 12 (which depict side walls of the obstacle course) and which area 10 extends, via various routes, between artificial cave or course entrance 13 and artificial cave or course exit 15). The fixed transceivers 20 can reside on the outside surface of the course 10, the inside surface of the course 10, or partially in and partially out of the course 10; and they may reside on any surface, including, but not limited to, the floors, walls, and ceiling of course 10. There may be wired or wireless links (e.g., wired link 21) among the transceivers 20, and the transceivers 20 may receive their power over wires or they may contain their own power sources. The fixed transceivers 20 can be linked together with other electronic equipment, including, but not limited to, the speleothem sensors 30 and other electronics disclosed in U.S. Pat. No. 8,574,085 and additional sensors for detecting the direction of flow of users through the course 10 (see, e.g., wired link 23 in FIG. 1). For example, transceivers 20 near entrance 13, emergency egress 14, and normal exit 15 in FIG. 1 may be especially employed for monitoring user entrance and/or exit from passage 10. Alternatively, or in addition, each of entrance 13, emergency egress 14, and normal exit 15 may include an electro-mechanical gate and/or an electronic sensor (e.g., a break-beam or "electric eye" sensor) for detecting and reporting to central electronic system 100 (see, e.g., FIG. 3) the passage of a person (user) through that entrance, emergency egress, or normal exit. Some or all of the fixed transceivers 20 can be reduced to transmitters only or receivers only.

Figure 2:
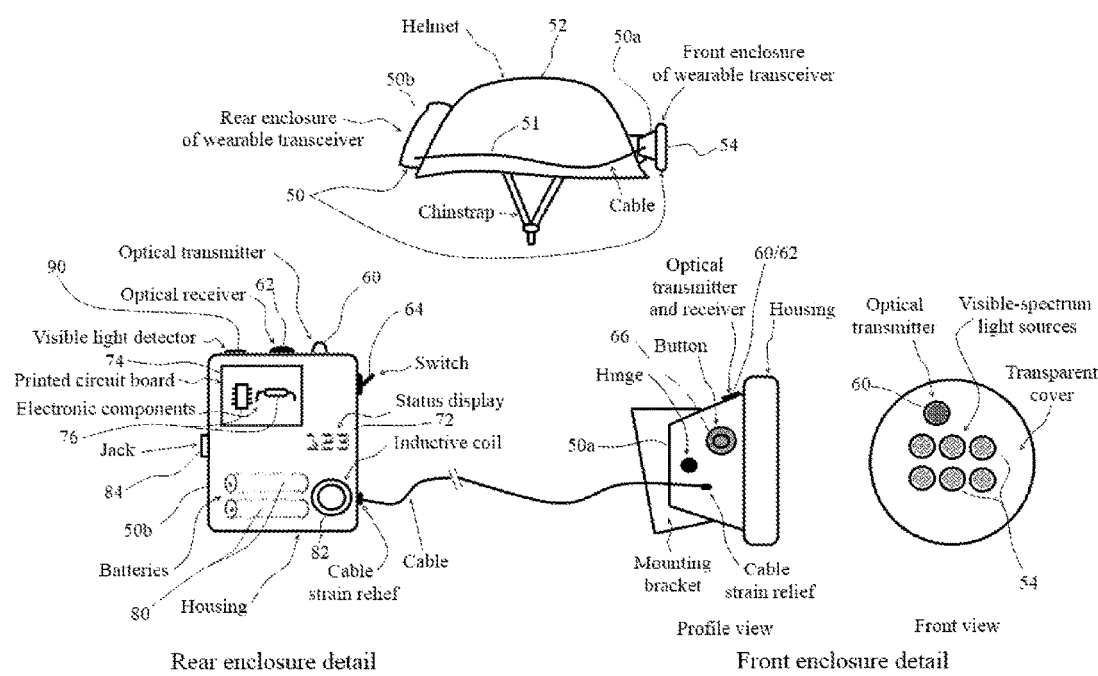
FIG. 2 comprises several views of an illustrative embodiment of a wearable transceiver in accordance with certain possible aspects of the present invention.

The aforementioned wearable transceivers 50 are affixed to the human users of course 10 via any suitable means, including, but not limited to, on a helmet 52 worn by the user as shown in FIG. 2. Again, because it is contemplated that more than one human user may be in course 10 at any given time, each such user wears a respective one of a plurality of wearable transceivers 50, each such transceiver 50 being uniquely identifiable by other components of the system and therefore serving as a means by which the particular user wearing that transceiver 50 can be identified while that user is in or at least near course or passage 10. In the illustrative embodiment shown in FIG. 2, typical transceiver 50 is incorporated with an electric light 54 affixed to a helmet 52, and the transceiver comprises two enclosures (front 50a and rear 50b) linked by a cable 51. In the particular embodiment shown, communication between each wearable transceiver 50 and the fixed transceivers 20 is accomplished via an optical link, and optical transmitters 60 and receivers 62 are located at various points on the front and rear enclosures 50a/b. Additionally, the wearable transceivers 50 may be fitted with devices for human input, such as switches 64, buttons 66, capacitive sensors, and knobs. The wearable transceivers 50 may also be outfitted with status indicators 72, including, but not limited to, colored lights or alphanumeric displays. The enclosures 50a/b may contain one or more printed circuit boards 74 with electronic components 76 such as microcontrollers. Each wearable transceiver 50 contains its own source of power 80, which may be replenished via any suitable means, including a wired connection or an inductive link 82. For the purpose of transferring power and/or information (e.g., when not operating wirelessly), the wearable transceivers 50 may be equipped with jacks 84 and/or other connectors. The wearable transceivers 50 may also be equipped with additional sensors, such as, but not limited to, ambient light detectors 90 for the automatic adjustment of the visible-spectrum electric light 54 associated with the wearable transceiver. Some or all of the wearable transceivers can be reduced to transmitters only or receivers only.

Figure 3:
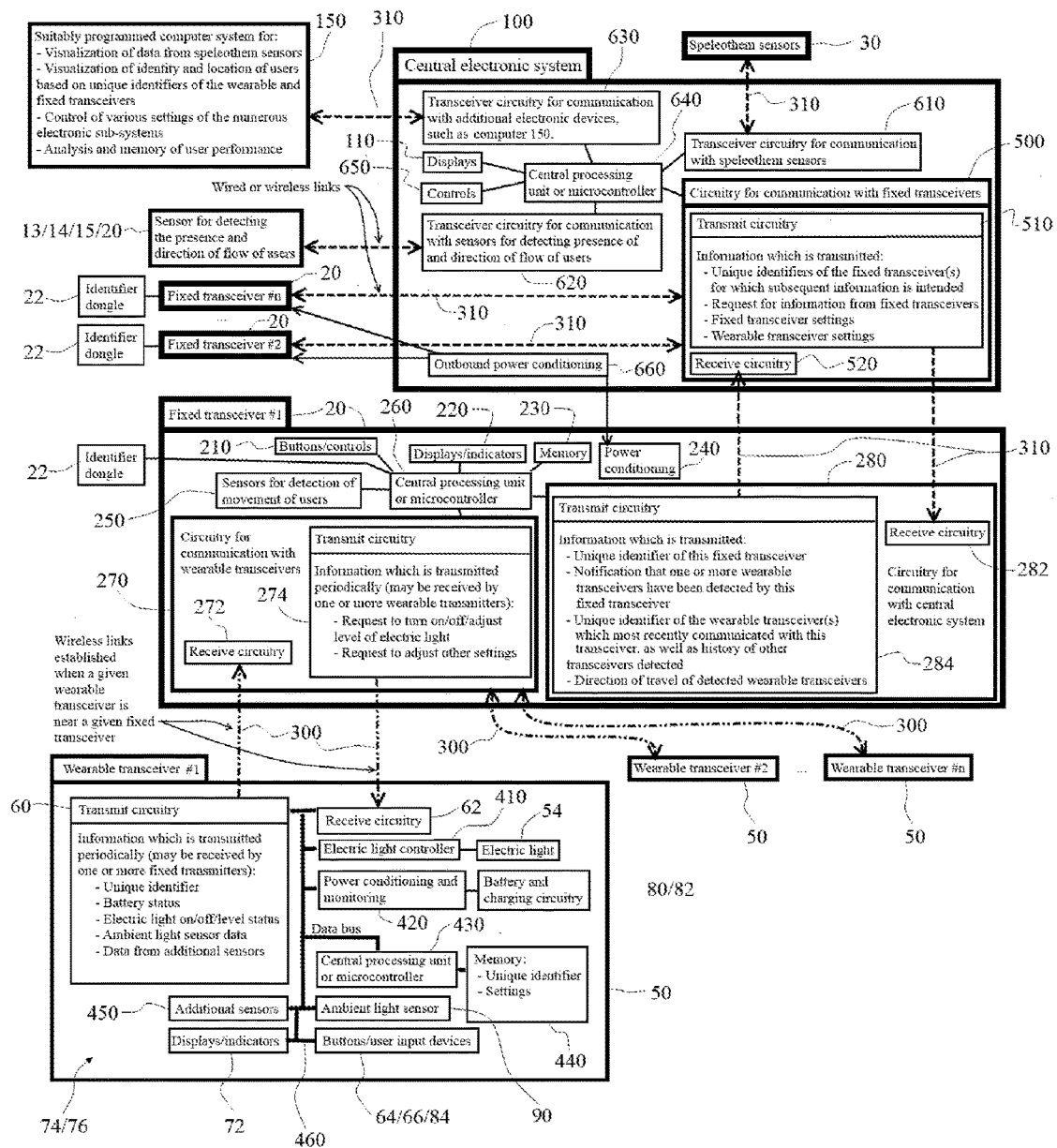
FIG. 3 is a diagram of an illustrative embodiment of communication among the fixed transceivers, the wearable transceivers, and additional electronic systems, and includes simplified schematic block diagrams of illustrative embodiments of various electronic components, all in accordance with certain possible aspects of the present invention.

Communication among the wearable transceivers 50, fixed transceivers 20, and a central electronic system 100 preferably allows for the identification and tracking of the users of the obstacle course 10, as shown in FIG. 3. As the users travel through the obstacle course 10, the wearable transceiver 50 on each user periodically transmits its unique identifier (ID) and status information. When the user is sufficiently close to a fixed transceiver 20 in the obstacle course, that fixed transceiver receives the unique ID and status information thus wirelessly broadcast by the wearable transceiver 50. After receiving these data from the wearable transceiver 50, the fixed transceiver 20 transmits information to the central electronic system 100. In one illustrative embodiment, each fixed transceiver 20 first identifies itself by its own unique ID to the central electronic system 100, and then transmits to the central electronic system the unique ID(s) of the wearable transceiver(s) 50 that it has recently (e.g., most recently) detected. The central electronic system 100 may communicate to the fixed transceivers 20 with requests for information, requests to change settings, and other information.

The central electronic system 100 preferably aggregates the data gathered from the fixed transceivers 20 and may transmit these aggregated data on to a suitably-programmed computer system 150 for further processing and/or display. Either the central electronic system 100, the programmed computer 150, or another electronic system may display information (e.g., via displays 110), including, but not limited to, which wearable transceivers 50 are in the course 10 at any given time, where in the course 10 each wearable transceiver 50 is at any given time, which wearable transceiver 50 is closest to a given speleothem when the speleothem sensor 30 is triggered, whether each wearable transceiver 50 is currently moving, which direction a wearable transceiver 50 is moving, and which wearable transceiver 50 was closest to an emergency egress 14 when the egress is opened.

Further considering certain aspects of the illustrative embodiment shown in FIG. 3, that FIG. includes a depiction of the circuitry of or associated with one of several representative fixed transceivers 20 (i.e., "fixed transceiver #1") in more detail. That representative fixed transceiver circuitry includes button controls 210, displays/indicators 220, memory 230, power conditioning circuitry 240, sensors for detection of movement of users 250, central processing unit or microcontroller 260, circuitry 270 for communication with the wearable transceivers, and circuitry 280 for communication with the central electronic system. Circuitry 270 in turn includes receive circuitry 272 and transmit circuitry 274, while circuitry 280 includes receive circuitry 282 and transmit circuitry 284. Central processing unit or microcontroller 260 is shown with connections to each of associated elements 210, 220, 230, 250, 270, and 280, as well as to the earlier-described identification dongle 22 of this particular fixed transceiver 20. Power conditioning circuitry 240 ensures that all other associated circuit elements receive the appropriate voltage(s) and current(s) required for successful operation of those other circuit elements.

Transmit circuitry 274 is the circuitry responsible for periodically wirelessly transmitting information to any one or more of the wearable transceivers 50 that is or are within wireless transmission range of the representative fixed transceiver 20 that is currently being described in detail. For example, that information from circuitry 274 may include an identifier of one or more wearable transceivers 50 that should respond to this transmission from circuitry 274 (as noted earlier, such identifiers are preferably unique for each wearable transceiver 50); a request or instruction to turn on, turn off, or adjust the level of the electric light 54 of that wearable transceiver 50 or those wearable transceivers 50; and/or a request or instruction to adjust one or more other settings of that wearable transceiver 50 or those wearable transceivers 50. An example of this last kind of request or instruction might be a request or instruction to change the information displayed by the status display 72 on one or more receiving wearable transceivers 50. FIG. 3 depicts by means of chain-dotted lines that wireless links like 300 are effective (i.e., "established") between any fixed transceiver 20 and any one of several wearable transceivers only when a given wearable transceiver 50 is sufficiently close to that fixed transceiver 20. For example, in the case of optical wireless communication between transceivers 20 and 50, there must typically be a direct line of sight between a transceiver 20 and a transceiver 50 in order for optical wireless communication 300 to occur between those two transceivers. Transmit circuitry 274 will be understood to include the transducer (e.g., an optical transmitter analogous to optical transmitter 60 on illustrative wearable transceiver 50 in FIG. 2) and circuitry for driving that transducer to cause transmission of the earlier-described signal information via communication link(s) 300.

Transmit circuitry 284 is the circuitry responsible for transmitting (e.g., periodically) information from the representative fixed transceiver 20 that is currently being described in detail to the central electronic system 100. As shown by the dotted lines 310 in FIG. 3, this communication may be via either wireless and/or wired connections. However, to any extent that these connections are wireless they are preferably made in a way that does not depend on proximity (closeness) between elements 20 and 100. For example, radio transmission having sufficient range (power) to be always effective for all elements 20 and 100 in the system may be used for any part or all of links 310 that are wireless. As shown in FIG. 3, the information transmitted by transmit circuitry 284 may include an identifier (preferably unique) for the representative fixed transceiver here being described (as mentioned earlier, the identifier dongle 22 of this transceiver 20 may provide the identifier for this transceiver); notification that this transceiver 20 has detected one or more of wearable transceivers 50 within effective wireless optical communication range of this transceiver 20; the unique identifier(s) of wearable transceiver(s) 50 thus most recently detected, as well as a history of other wearable transceiver(s) 50 recently detected by this transceiver 20 (e.g., all such wearable transceivers 50 recently detected that are still within effective wireless communication range of this transceiver 20); and the direction of travel of each detected wearable transceiver 50. (Various techniques for detecting direction of travel of users through passage 10 will be discussed in detail later in this specification.) As in the case of transmit circuitry 274, transmit circuitry 284 will be understood to include any necessary transducer and other circuitry required for driving the above-described signal information onto associated communication link 310.

Within the representative fixed transceiver circuitry 20 here being described in detail, receive circuitry 272 is responsible for receiving signal information from any one or more of wearable transceivers 50 that are within effective communication range of this transceiver 20 via above-described wireless communication link(s) 300. The particular information that this representative fixed transceiver 20 thus receives has already been described and will be even further described below in the further discussion of the representative one of wearable transceivers 50 (i.e., "wearable transceiver #1") that is shown extensively in FIG. 3. However, here it will be noted that receive circuitry 272 includes any necessary transducer and other circuitry for detecting signal information on any communication link 300 that is currently effective for this transceiver 20 and for converting that signal information to the electronic form suitable for processing within the circuitry of this transceiver 20. For example, in the case of optical communication link 300, receive circuitry 272 may include an optical receiver transducer analogous to optical receiver 62 on representative wearable transceiver 50 in FIG. 3 and circuitry for converting information received optically by that optical receiver transducer to electrical signals suitable for use elsewhere in the fixed transceiver 20 here being described.

Also within the representative fixed transceiver circuitry 20 here being discussed in detail, receive circuitry 282 is responsible for receiving signal information from central electronic system 100 via a link 310 of the type(s) described earlier for such links Again, the particular information that this representative fixed transceiver 20 thus receives from system 100 will be more fully described in the below further discussion of system 100. Here it will be noted, however, that receive circuitry 282 includes whatever is necessary (e.g., a wireless radio transducer) for detecting any signal information from central electronic system 100 via the associated communication link 310 and for converting that signal information to electronic signals suitable for use elsewhere within the fixed transceiver 20 here being discussed.

Further within the representative fixed transceiver 20 here being discussed in connection with FIG. 3, central processing unit or microcontroller 260 typically comprises a suitably programmed and/or configured microprocessor or microcontroller. For example, circuitry 260 may obtain the unique identifier code of this fixed transceiver from the associated identifier dongle 22 whenever that code is needed. All or part of any program coding used by circuitry 260 may be stored in associated memory 230 and retrieved by circuitry 260 from that memory as and when needed by circuitry 260. Circuitry 260 typically receives and appropriately processes (in accordance with its programming and/or configuration) information it receives from the associated receive circuitry 272 and/or 282. Circuitry 260 further typically outputs to transmit circuitry 274 and/or 284 information it has determined (again in accordance with its programming and/or configuration) should be transmitted to other elements of the system shown in FIG. 3. Circuitry 260 may use memory 230 for storage of any program coding and/or data that it needs in the course of its operation, and circuitry 260 may thus retrieve any such information or store any such information in memory 230 as and when appropriate. Circuitry 260 may be at least partly responsive to inputs from associated manually operable buttons or switches 210. Such buttons or switches 210 may be manually operable by a human operator of the system (e.g., to adapt the programming and/or configuration of circuitry 260 to any of several different uses for which this transceiver 20 may be needed). Circuitry 260 may control any of various associated displays and/or indicators 220, e.g., to indicate to a human operator of the system various aspects of the operational status of this transceiver 20.

Power conditioning circuitry 240 is typically hard-wired to a source of generally suitable electrical power (e.g., outbound power conditioning circuitry 660 (described below) in central electronic system 100). As has been mentioned, circuitry 240 ensures the availability of appropriate voltage(s) and current(s) for other components of transceiver 20.

It will be appreciated that although FIG. 3 shows possible wireless connections 300 only between the one representative fixed transceiver 20 that is shown in detail and the several depicted wearable transceivers 50 that are shown, this is only done to avoid unnecessarily over-complicating the drawing. In fact, as a general matter, any wearable transceiver 50 that is in use can establish a wireless connection 300 with any of the fixed transceivers 20 in the system that any such transceiver 50 is sufficiently close to.

Turning now to the details of the depiction of one representative wearable transceiver 50 (i.e., "wearable transceiver #1" in FIG. 3), the circuitry of that typical transceiver 50 includes transmit circuitry 60, receive circuitry 62, buttons and/or user input devices 64/66/68, displays and/or indicators 72, battery and charging circuitry 80/82, electric light 54, ambient light sensor 90, electric light controller 40, power conditioning and monitoring circuitry 420, central processing unit or microcontroller 430, memory 440, additional sensors 450, and data bus 460 for providing data and/or control signal interconnections between at least some of the other just-mentioned circuit elements.

Transmit circuitry 60 (which includes previously described optical transmitter or transducer 60 in FIG. 2) is responsible for transmitting signal information from the representative one of wearable transceivers 50 currently being discussed to the receive circuitry 272 of any fixed transceiver(s) 20 that is (are) close enough to establish wireless connection(s) 300 to that transceiver 50. As shown in FIG. 3, transmit circuitry 60 periodically transmits from the representative wearable transceiver 50 currently being discussed signal information such as the unique identifier code of this transceiver; the status of the battery 80 of this transceiver (e.g., how fully charged or discharged that battery is); the on, off, and, if on, the illumination level of light 54 of this transceiver; the level of ambient light detected by this transceiver (e.g., by this transceiver's ambient light sensor 90); and data from any additional sensors 450 of this transceiver. Transmit circuitry 60 can be generally like earlier-described transmit circuitry 274 in any fixed transceiver 20. Thus transmit circuitry 60 includes an output transducer (e.g., optical transmitter 60 in FIG. 2) for actually outputting signal information from the wearable transceiver and broadcasting that output signal information in the desired wireless medium and form for possible reception (via connection(s) 300) by one or more of the fixed transceivers 20 in the system; and transmit circuitry 60 also includes circuitry appropriate for driving that output transducer. Transmit circuit 60 may gather (e.g., via data bus 460) the information to be thus output from other associated components (e.g., power conditioning and monitoring circuitry for battery 80 status, electric light controller 410 for electric light 54 status, buttons/user input devices 64/66/84 for unique identifier information, and ambient light sensor 90 for ambient light level information). Alternatively, some or all of this information may be gathered by central processing unit or microcontroller 430 and then passed on to transmit circuitry 60 by element 430, possibly with some intermediate processing by element 430. Again, data bus 460 is typically used for communication of data and control signals among the various circuit element that are connected to it.

Receive circuitry 62 in the representative wearable transceiver 50 that is currently being discussed may be generally like the earlier-described receive circuitry 272 in the typical fixed transceiver 20. Thus receive circuitry 62 typically includes an input transducer (e.g., optical receiver 62 in FIG. 2) for receiving signal information via connection(s) 300 in whatever wireless medium and form is being used for such connections (e.g., optically, acoustically, by radio, etc.). In addition, receive circuitry 62 also typically includes circuitry for converting output signals of the just-mentioned input transducer to electronic signals suitable for use by other components of the representative transceiver 50 currently being discussed (e.g., the central processing unit or microcontroller 430 of that wearable transceiver). The types of signal information the receive circuitry 62 receives will be apparent from the earlier discussion of the various possible outputs of transmit circuitry 274 in a typical fixed transceiver 20. Thus, for example, receive circuitry 62 may receive from the transmit circuitry 274 of a nearby fixed transceiver 20 command signal information regarding whether the light 54 associated with that circuitry 62 should be turned on or off, and if on, then to what brightness level. Depending on how the wearable transceiver 50 circuitry is programmed and/or configured, this command information may be applied directly to electric light controller 40 for appropriate control of light 54; or this command information may first go to CPU or microcontroller 430, which then sends further appropriate data and/or control signals to light controller 410. This discussion is exemplary of how any wearable transceiver 50 in the system may handle and respond to any signal information it receives via a connection 300 and its receive circuitry 62.

Electric light controller circuitry 40 may use the value(s) of one or more data signals on bus 460 (e.g., from CPU or microcontroller 430, or from receive circuitry 62) to control the illumination level (brightness) of electric light 54. Such illumination level possibilities typically include the option of turning light 54 off completely.

Power conditioning and monitoring circuitry 420 typically includes circuitry for ensuring that battery 80 outputs voltage(s) and current(s) appropriate for satisfactory operation of other circuit elements of the representative wearable transceiver 50 currently being discussed. In addition, circuitry 420 may also output data indicative of how satisfactory such voltage(s) and current(s) are, and/or the level of charge remaining in battery 80. Circuitry 420 may apply such battery performance or status data to transmit circuitry 60 via bus 460. Or such data from circuitry 420 may first go (via bus 460) to CPU or microcontroller 430 for some initial processing, and then (again via bus 460) to transmit circuitry 60. This discussion of data flow from circuitry 420 is exemplary of how data/information may flow from other components of the representative wearable transceiver currently being discussed (e.g., from button/user input devices 64/66/84, from ambient light sensor 90, and/or from additional sensors 450).

Central processing unit ("CPU") or microcontroller 430 may be generally similar to earlier-discussed and similarly-named element 260 in a typical fixed transceiver 20. By the same token, memory circuitry 440 may be generally similar to earlier-described memory 230 in a typical fixed transceiver 20. Thus, for example, CPU or microcontroller 430 may use the associated memory 440 in the same general ways that similarly named elements 260 and 230 work together. It will therefore be understood that the earlier discussion of elements 260 and 230 applies again in general terms to elements 430 and 440. As a partial reminder of what was said earlier for those other generally similar elements, CPU or microcontroller 430 may be programmed and/or configured to control various operations of the associated circuitry (e.g., when associated transmit circuitry 60 will "periodically" transmit the signal information it should transmit, as well as specifying some or all of that transmitted information). The programming and/or configuration of CPU or microcontroller 430 may also enable component 430 to process signal information from other associated components such as 62, 420, 90, 64/66/84, and 450. Still further, this programming and/or configuration of component 430 may enable that component to process and output signal information (data and/or control) for use by or control of other associated components such as 60, 410, and 72. Memory 440 may be used to support various operations of component 430 (e.g., by storing at least some aspects of the programming or configuration of component 430). Memory 440 may also be used for storing various selectable characteristics of the associated wearable transceiver 50 (e.g., the unique identifier of that transceiver, various settings for operational control of other components, etc.).

Turning now to the details of the central electronic system 100 that are shown in FIG. 3, that system includes circuitry 500 for communication with fixed transceivers 20, transceiver circuitry 610 for communication with speleothem sensors 30, transceiver circuitry 620 for communication with sensors for detecting the presence of and direction of flow of users, transceiver circuitry 630 for communication with additional electronic devices such as computer 150, central processing unit or microcontroller 640, displays 110, controls 650, and outbound power conditioning circuitry 660.

Above-mentioned circuitry 500 for communication with fixed transceivers 20 includes, in turn, transmit circuitry 510 and receive circuitry 520. FIG. 3 shows that all of the fixed transceivers 20 in the system have wired or wireless connections 310 to circuitry 500. More particularly, FIG. 3 shows that these connections 310 allow the central transmit circuitry 510 to send electronic signal information to the receive circuitry 282 of each fixed transceiver 20, and additionally to allow the central receive circuitry 520 to receive signal information from the transmit circuitry 284 of each fixed transceiver 20. FIG. 3 further shows that the kinds of signal information that central transmit circuitry 510 may thus send to fixed transceivers 20 can include such information as the unique identifier(s) of one or more of the fixed transceivers 20 that central electronic system currently wishes to transmit to, a request signal for requesting information from the fixed transceiver(s) 20 thus addressed by means of the just-mentioned unique identifier(s), signals for controlling various settings of the fixed transceiver(s) 20 addressed by means of the just-mentioned unique identifier(s), and signals for controlling various settings of wearable transceivers 50 that are currently or may eventually be in communication with the fixed transceiver(s) addressed by the last-mentioned unique identifier(s). As an example of the types of signal information transmit circuitry 510 may transmit to one or more fixed transceivers 20, such information may request those fixed transceivers to send back the unique identifiers of all wearable transceivers 50 that are currently within communication range of each of those fixed transceivers 20. As another example of the types of signal information that transmit circuitry may transmit to one or more fixed transceivers 20, that signal information may instruct such a fixed transceiver 20 to relay to a wearable transceiver 50 that is currently in communication with that fixed transceiver an instruction to change the level of the light 54 of the identified wearable transceiver 50.

Further with regard to central receive circuitry 520, that circuitry receives signal information sent (via wired or wireless links 310) from the transmit circuitry 284 in the various fixed transceivers 20 that form part of the system. The legends in the one representative transmit circuitry 284 that is shown in detail in FIG. 3 identify some of the kinds of signal information that may thus be transmitted from any fixed transceiver transmit circuitry 284 to central receive circuitry 520. For example, such fixed-transceiver-to-central-receiver information may include (1) a unique identifier signal code for the transmitting fixed transceiver (e.g., provided by the identifier dongle 22 of that fixed transceiver), (2) signal information reporting that one or more wearable transceivers 50 has or have been detected in the vicinity or proximity of the transmitting fixed transceiver, (3) the unique identifiers of all such wearable transceivers 50 that have thus been detected near the transmitting fixed transceiver 20, and (4) the current settings of the wearable transceivers 50 thus detected near the transmitting fixed transceiver 20.

As mentioned above, central electronic system 100 also includes transceiver circuitry 610 for communication with speleothem sensors 30 via wired or wireless links 310. As discussed in detail in above-mentioned and incorporated by reference U.S. Pat. No. 8,574,085, artificial cave passage 10 typically includes a variety of artificial cave formations or speleothems (e.g., artificial stalagmites, artificial stalactites, artificial cave bacon, artificial cave popcorn, artificial gypsum flowers, etc.), all of which a human user is supposed to avoid touching or in some cases even approaching too closely.

As in prior U.S. Pat. No. 8,574,085, each such speleothem is equipped with sensors 30 (e.g., displacement or proximity sensors) for producing output signal information when a human user of artificial cave 10 improperly touches or comes too close to the speleothem. (As in U.S. Pat. No. 8,574,085, the term speleothem may also be used herein to include other types of cave artifacts that a human user of artificial cave 10 either should avoid or should interact with in certain ways. Examples of such other cave artifacts may include models of survey markers, paleontological articles, spiders, bats, rodents, salamanders, plant roots, etc. (all of which should generally not be touched) and human litter and trash (which should be touched for purposes of removal). All such additional types of "speleothems" may also be equipped with sensors 30 for detecting appropriate or inappropriate interaction of human users with those "speleothems.") Transceiver circuitry 610 receives electronic signals output by any of the above-described speleothem sensors 30 to indicate that there has been human-user interaction (usually inappropriate and therefore "harmful" interaction) with the speleothem associated with that sensor 30.

Some "speleothems" in artificial cave 10 may be made deliberately interactive. For example, a speaker associated with a "speleothem" may produce an audible warning to a human user who is coming too close to the "speleothem." Or an artificial animal "speleothem" such as an artificial bat or reptile may be equipped to move or make noise when approached too closely by a human user or when the user shines his or her light 54 on the artificial animal. In such cases, transceiver circuitry 610 can be responsible for sending signals back to the electronics of circuitry 30 associated with such "speleothems" to generate sounds and/or motions of or adjacent to those "speleothems."

Also as previously mentioned, central electronic system 100 includes transceiver circuitry 620 for communication with sensors for detecting presence and direction of flow of users through artificial cave passage 10. Any of fixed transceivers 20 can provide signal information for assisting in this task. But some fixed transceivers 20 and/or transducers 13/14/15 may be especially important for this function. For example, a transducer or transceiver 20 associated with cave passage entrance 13 may detect whenever a new user enters cave passage 10, and the unique identifier of that user's wearable transceiver 50 may be detected by the fixed transceiver 20 immediately adjacent to entrance 13 to enable transceiver circuitry 620 to record that this new user has just entered the artificial cave. Similarly, a transducer or transceiver 20 associated with "normal" cave passage exit 15 may detect whenever a user leaves cave passage 10 via exit 15. The unique identifier of the exiting user's wearable transceiver 50 may be detected by the fixed transceiver 20 immediately adjacent to exit 15 to enable transceiver circuitry 620 to record that the exiting user is no longer in cave passage 10. Emergency exit 14, a nearby fixed transceiver 20, and transceiver 620 may function similarly to detect and record when a user (identified by that user's wearable transceiver 50) exits cave passage 10 via emergency exit 14. Further discussion of detecting the direction of flow of users is provided later in this specification.

Turning now to central processing unit or microcontroller 640, this element interacts with most of the other components of central electronic system 100 to provide support for and control of those other components, as well as to process and analyze information from those other elements. For example, central processing unit 640 may receive from receive circuitry 520 information about which users (each uniquely identified by his or her wearable transceiver 50) have been detected near which of the fixed transceivers 20 in cave passage 10. If that received signal information warrants that some signal information (e.g., user light-level adjustment information) should be sent back to one or more users, central processing unit 640 may control transmit circuitry 510 to send such responsive signal information back to the appropriate user via the fixed transceiver 20 which that user has been detected to be near. As another example, central processing unit 640 may receive from transceiver circuitry 610 signal information that a user has undesirably contacted a speleothem in cave passage 10.

Central processing unit 640 has also received information via circuitry 500 as to which user(s) is (are) currently near the fixed transceiver 20 that is closest to the speleothem that has been contacted. Accordingly, central processing unit 640 can attribute this undesirable speleothem contact to this user or these users and make a record that this user or these users undesirably contacted this speleothem. (Alternatively, this association and/or recording of speleothem contact with a particular user or users can be performed by other circuitry (i.e., computer 150) upstream from central processing unit 640.)

As yet another example of the functioning and operation of central processing unit 640, this element may control transceiver circuitry 610 to send signals back to other components in the vicinity of a speleothem sensor 30 that has detected undesirable interaction with a speleothem for such purposes as causing an audible warning to any nearby user or to cause other feedback to the user (e.g., motion of an artificial bat, salamander, or the like).

Central processing unit 640 may also interact with transceiver circuitry 620 for compiling and maintaining a record of what users are currently in passage 10 and/or in what direction each user is moving in the passage. (Alternatively, this type of information may be compiled and maintained by other circuitry (i.e., computer 150) upstream from central processing unit 640.)

Still another function of central processing unit 640 is to communicate with computer 150 via transceiver circuitry 630. Central processing unit 640 may also be responsive to local controls 650. For example, such local controls may enable the operator of the system to effectively disable a speleothem sensor 30 that seems to be malfunctioning, to change the sensitivity of a speleothem sensor, etc. Central processing unit 640 may also control various local displays 110. For example, such local displays may indicate (e.g., alphanumerically) which user has just had an inappropriate ("harmful") interaction with which speleothem.

A final element of central electronic system 100 is outbound power conditioning circuitry 660. This component helps to ensure that all elements throughout the system that receive electrical power by direct wiring receive appropriate and safe electrical currents and voltages at all times.

Computer 150 may provide overall control of certain aspects of the system, as well as accumulating and reporting data that results from various aspects of operation and use of the system. For example, computer 150 may include a human-readable output device such as a computer or video monitor for displaying data about user interactions with various speleothems (e.g., a list of all speleothems that a particular user has inappropriately ("harmfully") interacted with as that used passes through passage 10). It will be apparent from earlier discussion herein how the system may collect such data and forward it on to computer 150 for organization and output (e.g., display) by that computer and peripheral devices of that computer. As another example, computer 150 may use data collected by the system regarding the current location of each user in passage 10 to visually or graphically display the current location of each user on a displayed replica of passage 10. Again, it will be apparent how information collected by each fixed transceiver 20 about the identities of the user(s) near that fixed transceiver is communicated through the system to computer 150 so that computer 150 can organize and display that information. (As has already been said at several places above, users are identified by unique identifiers output by each user's wearable transceiver 50.)

Another function that computer 150 may perform is to control various settings used by other components or elements of the system. An example of such settings may be the sensitivities of various speleothems to approach to or contact of the speleothem by users of the system. As another example, entrance 13 may be barred by signals from computer 150 if the computer detects that there are already too many users in passage 10.

Still another function that computer 150 may perform is to analyze, store in memory, and report (e.g., via an output display) various aspects of the performance of various users. For example, a user's performance in one session in passage 10 may be compared to that user's performance in another session in the passage. For such purposes, user performance may be based on such things as the length of time the user needed to get all the way through passage 10 and/or the number of inappropriate speleothem contacts the user made while passing through the passage. As another example, computer 150 may be able to output comparisons of the performance of different users.

As has already been mentioned, in some embodiments it may be desirable to determine the direction of travel of users who are currently in passage 10. Additional discussion of examples as to how this may be accomplished in accordance with the invention will now be provided.

Figure 5:
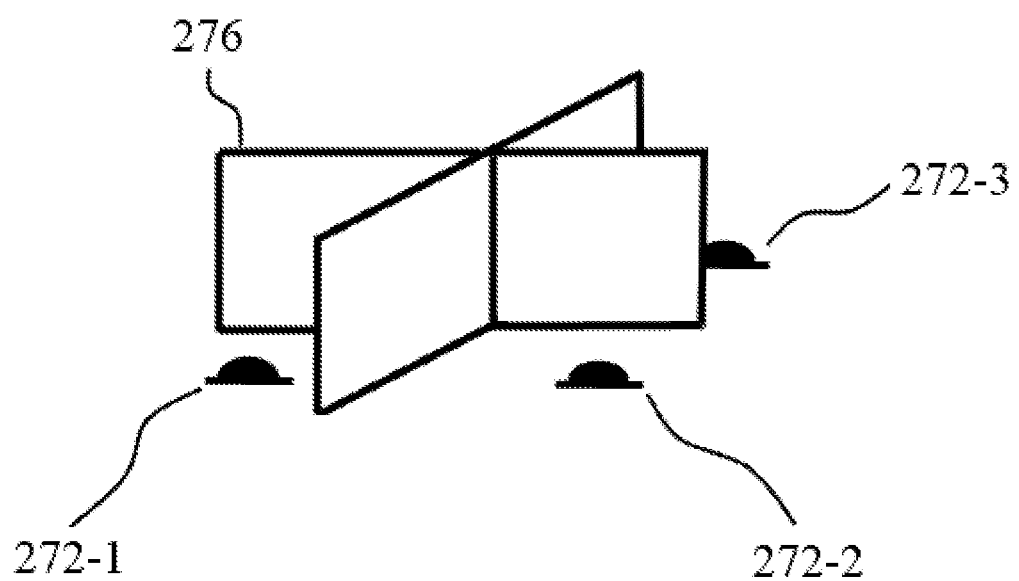
FIG. 5 is a simplified isometric view of an illustrative embodiment of a group of electronic sensors for detection of flow of users through a cave obstacle course in accordance with certain possible aspects of the present invention.

The representative fixed transceiver 20 show in detail in FIG. 3 can detect the direction of travel of a user in any of various suitable ways. In one embodiment, each fixed transceiver 20 contains multiple instances of receive circuitry 272. As shown in FIG. 5, each instance of receive circuitry 272 is separated from the others by a material 276 which is opaque to the transmission medium in such a way that each instance of receive circuitry 272 has a detection area which is spatially unique from the detection areas of the other instances of receive circuitry 272 within the given fixed transceiver 20. In other words, the instances of receive circuitry 272 are isolated from one another by 276 such that wireless data from any given wearable transceiver 50 is incident upon at most one of the instances of receive circuitry 272 at any given time. As the wearable transceiver is carried by the user through the passage, the wireless signal will be incident upon one of the instances of receive circuitry 272 in a given fixed transceiver 20 before it is incident upon the other instances of receive circuitry 272 within that same fixed transceiver. By determining which instance of receive circuitry 272 detected a given wearable transceiver first, the central processing unit 260 within the given fixed transceiver can determine from whence the user came, and therefore in which direction that user is traveling. In addition to detecting which instance of receive circuitry 272 first detected a given wearable transceiver 50, the central processing unit 260 can also determine which instance of receive circuitry 272 was the last instance to detect a given wearable transceiver 50 prior to the wearable transceiver moving out of range of all receivers 272 within a given fixed transceiver 20, which allows the central processing unit to provide more accurate direction-of-travel information.

Figure 6:
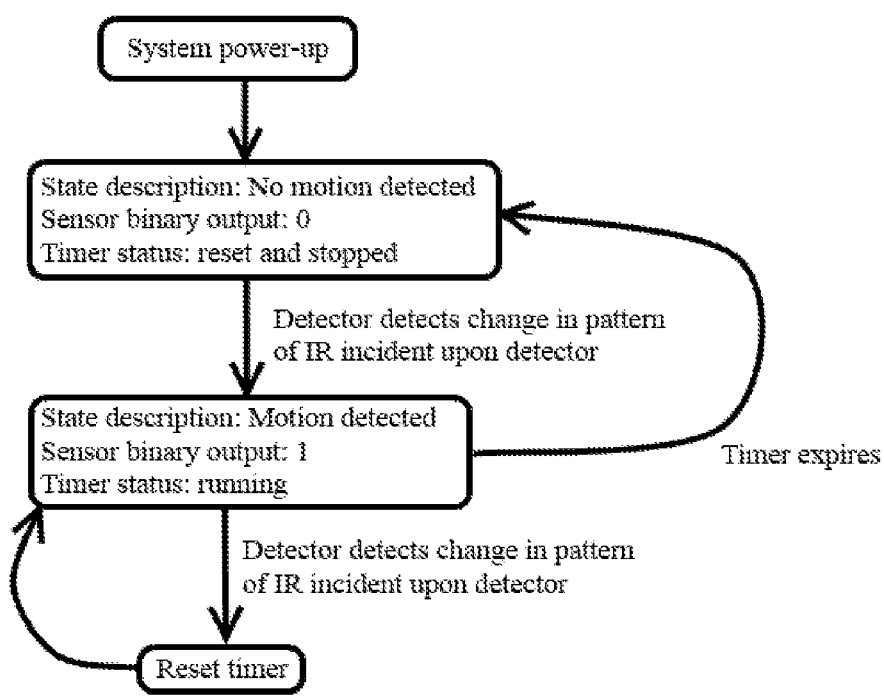
FIG. 6 is a state diagram of an illustrative embodiment of logic for detection of flow of users through a cave obstacle course in accordance with certain possible aspects of the present invention.

In another embodiment, direction of travel by users is detected with dedicated sensors 250, shown in FIG. 3. Two or more pyroelectric infrared (PIR) detectors can be used for this purpose. Each PIR detector produces a binary output, the state of which is directly correlated to the presence or absence of recent change in the amount of infrared (IR) energy incident upon the detector. Each PIR detector is associated with a timer. As shown by the state diagram in FIG. 6, when humans (acting as heat sources detectable by the PIR detectors) traveling through the cave passage move within range of a PIR detector, the detector detects a change in the amount of IR energy incident on the detector. When this detection occurs, the PIR detector output changes state and the timer associated with the particular PIR detector is reset and started. Each time that further motion of heat sources is detected, the timer is reset and started. If sufficient time passes without motion being detected, the timer will expire, and the detector's binary output will change state again to indicate that no recent motion has been detected. The two or more PIR detectors associated with a given fixed receiver 20 are arranged in such a way that the detection range of each PIR detector is mutually exclusive from the detection range(s) of the other detector(s). A representative arrangement is the same as the arrangement of receivers 272 shown in FIG. 5. By inspecting the binary output of all PIR detectors associated with a given fixed transceiver 20, a particular fixed transceiver can determine in which order the multiple PIR detectors saw movement, and the fixed transceiver can infer the direction of travel of human users within the passage.

Figure 4:
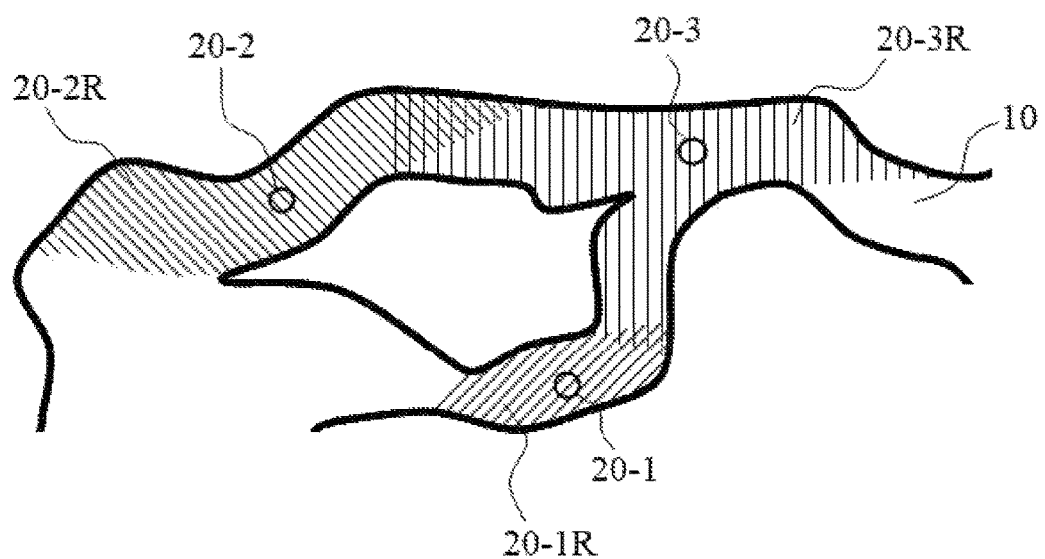
FIG. 4 is an enlargement of a representative portion of FIG. 1 with some shading added to further illustrate certain possible aspects of the invention.

In some respects recapitulating and amplifying the foregoing, certain aspects of the invention relate to an artificial cave obstacle course system as shown, for example, in FIGS. 1-3. Such a system may include an artificial cave passage 10. The system may also include a plurality of wearable transmitters (e.g., 50, 60). Each wearable transmitter can be worn by a respective one of a plurality of human users passing through passage 10. There can be more than one such user in passage 10 at any given time. Each of the wearable transmitters 50, 60 may broadcast a respective one of a plurality of unique user identification codes (e.g., provided by the transmit circuitry 60 of the transmitter). The system may further include a plurality of fixed receivers 20, 272 spaced from one another throughout passage 10. Each fixed receiver 20, 272 may have a respective broadcast signal reception area in a portion of passage 10 that is adjacent to that fixed receiver. For example, FIG. 4 shows a representative portion of passage 10 from FIG. 1 with three representative fixed receivers 20 from FIG. 1 now numbered 20-1, 20-2, and 20-3 for greater particularity. The broadcast signal reception area of fixed transceiver 20-1 is indicated by the cross hatched area 20-1R. Differently cross hatched area 20-2R indicates the broadcast signal reception area of fixed receiver 20-2. The still further differently cross hatched area 20-3R indicates the broadcast signal reception area of fixed receiver 20-3. It will be evident that each of these broadcast signal reception areas is approximately the line-of-sight area within passage 10 from the respective fixed receiver 20. This is consistent with use of line-of-sight wireless communication to each fixed receiver. The walls, floor, and ceiling of passage 10 bound line-of-sight signaling areas inside the passage. Infrared signal communication is an example of such basically line-of-sight communication that can be used; but there can be other relatively short-haul communication techniques that similarly allow subdivision of passage 10 into a number of relatively small broadcast signal reception areas, one area per receiver. Examples of such other techniques may include low-power ultrasonic signaling, low-power radio signaling, and the like. There may be some overlap between the broadcast signal reception areas of the various receivers 20 in passage 10, but there is also preferably some non-overlap among these areas. It is preferable for the broadcast signal reception areas of all of receivers 20 to collectively cover all or at least most of passage 10.

In embodiments like those here being recapitulated or described, each fixed receiver 20, 272 is able to receive the user identification signal broadcast by any of the wearable transmitters 50, 60 that are currently within the broadcast signal reception area (e.g., 20-1R, 20-2R 20-3R, etc.) of that fixed receiver. Preferably, each fixed receiver 20, 272 is not able to receive signals broadcast by any of the wearable transmitters 50, 60 that are not currently within the broadcast signal reception area of that fixed receiver, e.g., wearable transmitters 50, 60 that are in other portions of passage 10 outside the broadcast signal reception area of that fixed receiver. In such embodiments the system further includes circuitry (e.g., 260, 250, 220, 230, 280, 100, 150) for collecting from each fixed receiver 20, 272 signal information identifying the wearable transmitters 50, 60 from which that fixed receiver is currently receiving user identification signals.

Consistent with the foregoing objective of having each fixed receiver 20, 272 able to receive signals broadcast by only those wearable transmitters 50, 60 that are currently in the relatively small or limited broadcast signal reception area adjacent to that fixed receiver, wearable transmitters 50, 60 also employ relatively low-power and/or line-of-sight signal broadcasting. Once again, examples of such line-of-sight and/or low-power transmitter 50, 60 broadcasting include infrared signals, low-power acoustic signals, low-power radio signals, etc.

In embodiments such as are currently being discussed the system may further include a plurality of artificial speleothems 30 spaced from one another throughout passage 10. Each speleothem 30 is preferably disposed in passage 10 so that it is possible for a user to pass that speleothem without causing harm to that speleothem if that speleothem were a real speleothem in a real cave. However, each speleothem 30 is also preferably disposed in passage 10 so that it is alternatively possible for a user to interact with the speleothem in a way that would be harmful to a real speleothem if the user does not exercise sufficient care in passing the speleothem. Such embodiments may also include a plurality of sensors (also designated 30), each of which is associated with a respective one of the artificial speleothems and each of which detects any harmful interaction with the associated speleothem by a user who does not exercise sufficient care in passing the speleothem. (Above-incorporated U.S. Pat. No. 8,574,085 shows many examples of suitable artificial speleothems and sensors for such speleothems.) In such embodiments as are currently being discussed the recently-mentioned circuitry (e.g., 260, 250, 220, 230, 280, 100, 150) for collecting additionally collects (e.g., via components 610) signal information from each of the sensors 30 indicative of that sensor detecting a harmful interaction with the speleothem associated with that sensor.

Further in embodiments such as are currently being discussed, each of the speleothems 30 may be adjacent to a respective one of the fixed receivers 20, 272 so that any user who harmfully interacts with that speleothem is then within the broadcast signal reception area of the fixed receiver 20, 272 adjacent to that speleothem. More particularly, the immediately preceding sentence typically means that each speleothem 30 is in the broadcast signal reception area of the fixed receiver 20, 272 that is "adjacent" to that speleothem.

Still further in embodiments such as are here being discussed, the recently-mentioned circuitry (e.g., 260, 250, 220, 230, 280, 100, 150, 610) for collecting may further include circuitry (e.g., 640) for correlating (a) signal information from each of the sensors 30 indicative of that sensor detecting a harmful interaction with the speleothem 30 associated with that sensor with (b) signal information from the fixed receiver 20, 272 that is adjacent to that speleothem so that any user within the broadcast signal reception area (e.g., 20-1R, 20-2R, 20-3R, etc.) of that fixed receiver is identified as the probable cause of the harmful interaction with the speleothem adjacent to that fixed receiver.

Yet further in embodiments such as are currently being discussed, the circuitry (e.g., 640) for correlating may further include circuitry (e.g., 630, 150) for storing results of the correlating to produce a stored record of each user's probable harmful interactions with the speleothems.

Still further in embodiments such as are currently being discussed, the circuitry (e.g., 640) for correlating may further include circuitry (e.g., 150) for visibly displaying information indicative of the stored record of any user's probable harmful interactions with the speleothems.

Another feature that the embodiments currently being recapitulated may relate to involves monitoring the entrance 13 through which users enter passage 10. In accordance with this feature a first of the fixed receivers 20, 272 (e.g., the fixed receiver 20 that is just inside entrance 13 in FIG. 1) is located adjacent entrance 13 so that each user entering passage 10 passes through the broadcast signal reception area of said first fixed receiver. (Although the broadcast signal reception area of this first fixed receiver 20 is not expressly depicted in FIG. 1, it will be apparent from the typical examples of other broadcast signal reception areas shown in FIG. 4 and discussed above in connection with that FIG. that any person entering passage 10 through entrance 13 would have to pass through the broadcast signal reception area of the first fixed receiver that is just inside entrance 13.) Further in accordance with the feature currently being discussed, the recently mentioned circuitry (e.g., 260, 250, 220, 230, 280, 100, 150) for collecting includes circuitry for collecting from said first fixed receiver 20 signal information identifying the wearable transmitter 50, 60 of each user who enters passage 10. A further feature of such embodiments may be circuitry (e.g., 150) for storing the wearable transmitter identifying signal information collected from said first fixed receiver 20 (e.g., the fixed receiver 20 just inside entrance 13 in FIG. 1) in order to produce a stored record of the users who have entered passage 10.

Still another feature that embodiments like those currently being recapitulated may relate to involves monitoring the exit 15 through which users exit passage 10. In accordance with this feature a second fixed receiver 20, 272 (e.g., the fixed receiver 20 that is just inside exit 15 in FIG. 1) is located adjacent exit 15 so that each user exiting the passage passes through the broadcast signal reception area of said second fixed receiver. (Again, although the broadcast signal reception area of this second fixed receiver 20 is not expressly depicted, it will be apparent from the typical examples of areas 20-1R, 20-2R, and 20-3R in FIG. 4 that any person exiting passage 10 via exit 15 will have to pass through the broadcast signal reception area of the second fixed receiver that is just inside exit 15.) Further in accordance with the feature currently being discussed or recapitulated, the recently mentioned circuitry (e.g., 260, 250, 220, 230, 280, 100, 150) for collecting includes circuitry for collecting from said second fixed receiver 20 signal information identifying the wearable transmitter 50, 60 of each user who exits passage 10. If desired, the just-mentioned circuitry for collecting may further include circuitry (e.g., 150) for deleting from any stored record (such as was mentioned earlier) of users who have entered passage 10 the wearable transmitter identifying signal information collected from said second fixed receiver 20 (e.g., the fixed receiver just inside exit 15 in FIG. 1). This has the effect of making the just-mentioned stored record a list of all users who are currently in passage 10.

Embodiments like those most recently discussed or recapitulated are examples of embodiments in which wearable transceivers 50 may only need to have transmitter capability and in which fixed transceivers 20 may only need to have receiver capability. It will be apparent from what has been shown and described elsewhere herein that in other embodiments each of the wearable transmitters 272 may be a component of a respective one of a plurality of wearable transceivers 20, each wearable transceiver also including a respective one of a plurality of wearable receivers 62. In such a case these embodiments may further include fixed transmitter circuitry 20, 274 for broadcasting signals to the wearable receivers 62.

In embodiments such as those recapitulated in the immediately preceding paragraph, each of the wearable receivers 62 may be selectively responsive to received signals that include a respective one of a plurality of different identifier codes. For example, the unique identifier stored in memory 440 as shown in FIG. 3 may be used by central processing unit or microcontroller 430 to render any particular wearable transceiver 50 fully responsive to only signals received via circuitry 62 that include that unique identifier. In this way each wearable transceiver 50 may be individually addressed for purposes of remote control by using that wearable transceiver's individual and unique identifier.

In embodiments such as have just been recapitulated the fixed transmitter circuitry 274 may be configured to broadcast signals that include (a) one of the just-mentioned identifier codes (corresponding to the unique identifier in the memory 440 of one of the wearable transceivers 50) and (b) a command signal (e.g., one or more of the "requests" in transmit circuitry 274 in FIG. 3) for causing the wearable receiver 62 that is selectively responsive to that identifier code to initiate an operation in accordance with that command signal. For example, the operation initiated in response to such a command signal may be a change in the output level of a light 54 worn by the user wearing the wearable receiver 62 that is selectively responsive to that identifier code broadcast with that command signal.

In embodiments such as have just been recapitulated, at least one of the fixed receivers 272 is a component of a fixed transceiver 20 that includes the most recently mentioned fixed transmitter circuitry 274.

In other embodiments of the types that are currently being recapitulated, each of at least a subplurality of the fixed receivers 272 is a component of a respective one of at least a subplurality of fixed transceivers 20, and each of at least said subplurality of said fixed transceivers 20 includes a replication of said most recently mentioned fixed transmitter circuitry 274.

Recapitulating certain other aspects of the foregoing, an artificial cave obstacle course system in accordance with various embodiments of the invention may include an artificial cave passage 10 having an entrance 13 through which a human user can enter the passage. The system may further include receiver apparatus 62 worn by a user while in passage 10. The receiver apparatus may include a light 54 that can be turned on while the user is in passage 10 to help the user see inside the passage. The system may include a detector (e.g., the instance of component 20 (and especially its subcomponents 272, etc.) that is closest to entrance 13 in FIG. 1) for detecting that a user is entering passage 10 via entrance 13. The system may still further include transmitter apparatus (e.g., the instance of component 274 that is in the just-mentioned instance of component 20) responsive to the detector for wirelessly signaling the receiver apparatus 62 to turn on the light 54 of the receiver apparatus worn by the user entering the passage.

In embodiments such as have just been recapitulated, passage 10 may additionally have an exit 15 through which a human user can exit the passage. The system may then have a second detector (e.g., the instance of component 20 that is just inside exit 15 in FIG. 1, and especially the subcomponent 272 and related elements of that component 20) for detecting that a user is exiting passage 10 via the exit. The last-mentioned transmitter apparatus (e.g., the last-mentioned instance of component 274 and related elements) may then be additionally responsive to the second detector for wirelessly signalling the receiver apparatus 62 to turn off the light 54 of the receiver apparatus worn by the user exiting passage 10.

Recapitulating certain still other aspects of the foregoing, an artificial cave obstacle course system in accordance with various other embodiments of the invention may include an artificial cave passage 10 have an entrance 13 through which human users can enter the passage. The system may further include a plurality of wearable transceivers 50, each of which can be worn by a respective one of a plurality of users while in passage 10. Each of the wearable transceivers 50 may have a respective one of a plurality of different user identification codes (e.g., the unique identifier stored in the memory 440 of the wearable transceiver) associated with it. Each wearable transceiver 50 may wirelessly broadcast (e.g., as shown by wireless communication links 300) signals that include the user identification code associated with that wearable transceiver. Each wearable transceiver 50 may further be selectively responsive to received signals that include the user identification code associated with that wearable transceiver. The system may still further include detector apparatus (e.g., the instance of component 20 that is just inside entrance 13) for detecting that a user is entering passage 10 via entrance 13, the detector apparatus using the user identification code wirelessly broadcast by the wearable transceiver 50 worn by that user to wirelessly transmit back to that wearable transceiver signals that include that user identification code and an instruction to turn on the light 54 of that wearable transceiver.

In embodiments such as have just been recapitulated, passage 10 may also have an exit 15 through which human users can exit the passage. The system may then further include second detector apparatus (e.g., the instance of component 20 that is just inside exit 15) for detecting that a user is exiting the passage via exit 15. The second detector apparatus may use the user identification code wirelessly broadcast by the wearable transceiver 50 worn by that user to wirelessly transmit back to that wearable transceiver signals that include that user identification code and an instruction to turn off the light 54 of that wearable transceiver.

Recapitulating yet other aspects of the foregoing, an artificial cave obstacle course system in accordance with yet other possible embodiments of the invention includes an artificial cave passage 10. The system may further include a plurality of wearable transceivers 50, each of which can be worn by a respective one of a plurality of human users passing through passage 10, each wearable transceiver broadcasting (e.g., via wireless links 300) a respective one of a plurality of unique user identification signals (e.g., the unique user identifier in the memory 440 of that wearable transceiver). The system may still further include a plurality of fixed transceivers 20 spaced throughout passage 10. Each fixed transceiver 20 has a respective broadcast signal reception area (e.g., 20-1R, 20-2R, 20-3R, etc.) in a portion of the passage 10 that is adjacent to that fixed transceiver. Each fixed transceiver 20 is preferably able to receive the user identification signal broadcast by any of the wearable transceivers 50 that are currently within the broadcast signal reception area of that fixed transceiver. The system may yet further include circuitry (e.g., 100, 150) for collecting from each fixed transceiver 20 the signal information identifying the wearable transceivers 50 from which that fixed transceiver is currently receiving user identification signals.

Any of the systems described and/or recapitulated above may also include components (e.g., FIG. 5, FIG. 6, 250, 284, 13/14/15/20, 620) for detecting the direction of travel of a user in passage 10.

It will be understood that the foregoing is only illustrative of the principles of the invention, and that various modifications can be made by those skilled in the art without departing from the scope and spirit of the invention. For example, various methods of operating artificial cave obstacle course systems such as are described in detail above are within the scope of this invention. Just a few representative illustrations of such methods are provided in the next several paragraphs.

An example of methods of operating an artificial cave obstacle course system in accordance with certain possible aspects of the invention includes automatically detecting when a user enters the obstacle course and automatically turning on a light worn by the user who has thus been detected entering the obstacle course. Such a method may further include automatically detecting when a user exits the obstacle course and automatically turning off the light of the user who has thus been detected exiting the obstacle course.

Another example of methods of operating an artificial cave obstacle course system in accordance with certain possible aspects of the invention includes automatically detecting the direction of travel of a user in the obstacle course.

Still another example of methods of operating an artificial cave obstacle course system in accordance with certain possible aspects of the invention includes automatically detecting the identity of each user who enters the obstacle course. Such a method may further include automatically detecting the identity of each user who exits the obstacle course.

Yet another example of methods of operating an artificial cave obstacle course system in accordance with certain possible aspects of the invention includes automatically detecting the identity of each user who is currently in any one of a plurality of areas that are spaced throughout the obstacle course. Such a method may further include automatically detecting any user interaction with an artificial speleothem that is in any of said areas. Such a method may still further include automatically identifying a user who is currently in any one of said areas as the user probably responsible for any concurrent user interaction with the artificial speleothem in that area.

Other possible aspects of the invention relate to monitoring user and/or operator presence and/or activity in and/or near the artificial cave for such purposes as at least discouraging too many users from being present in the cave at any one time (e.g., by alerting prospective users not to enter the cave when the number of users already in the cave reaches a predetermined desired maximum number) and/or automatically turning off, powering down, or rendering dormant various electronic components of the cave system, e.g., when there has not been human presence and/or activity associated with the cave for at least a predetermined interval of time. Terms that are sometimes used herein to refer to monitoring or detecting the presence and/or activity or motion of a human include "human detection," "human detector," "means for detecting a human," "detecting a human," and the like. "Detecting the presence of a human" or the like as used herein means detecting the human without regard for whether the human is moving or has recently moved. "Detecting human motion" or the like as used herein means detecting the human by sensing present or recent motion or physical activity (typically gross or externally perceptible movements) of the human Thus "human detection" or the like is generic to (1) "human presence detection" or the like and (2) "human motion detection" or the like.

Figure 7:
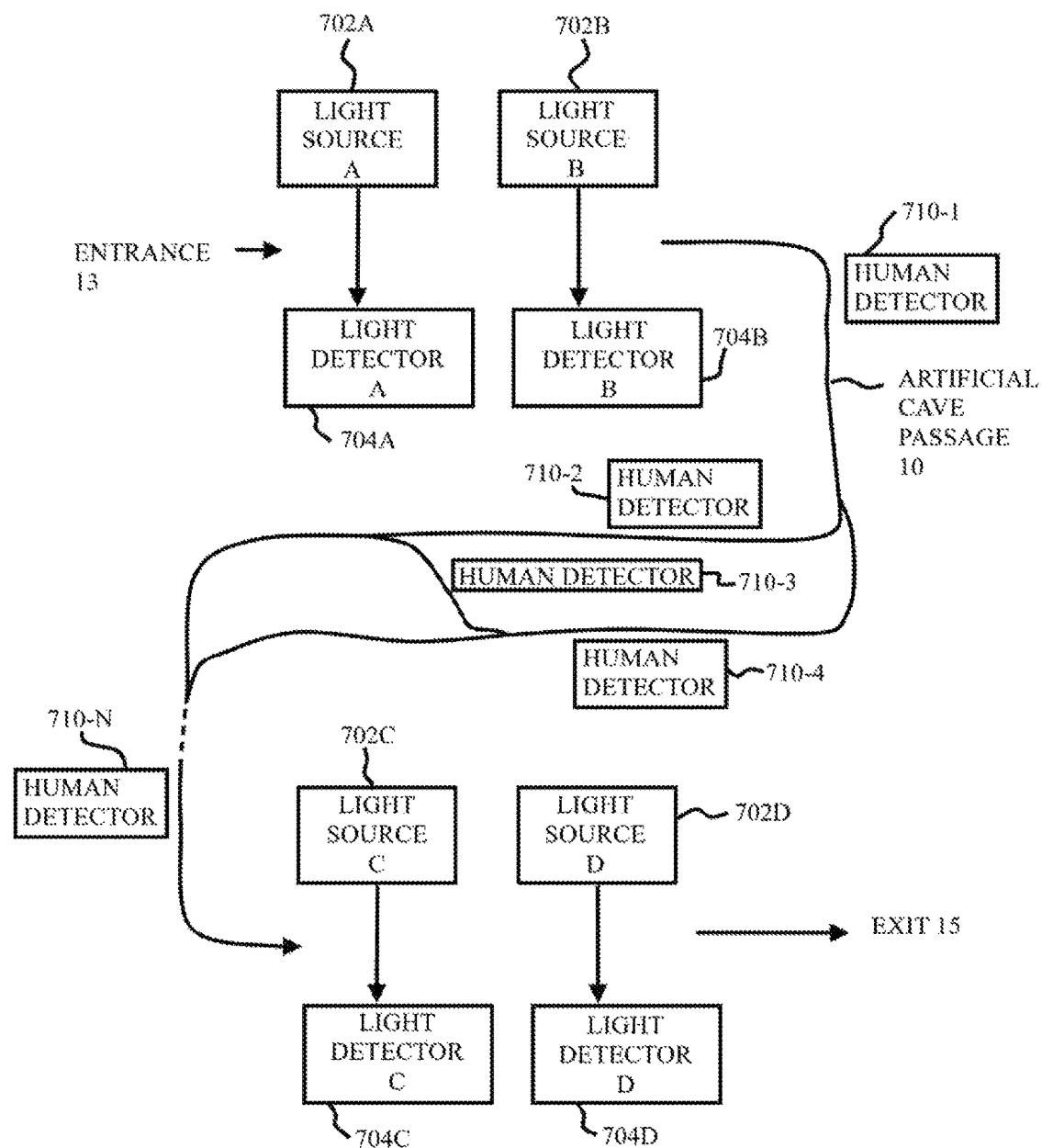
FIG. 7 is a simplified schematic block diagram showing an illustrative embodiment of certain further possible features in accordance with the invention.
Figure 8:
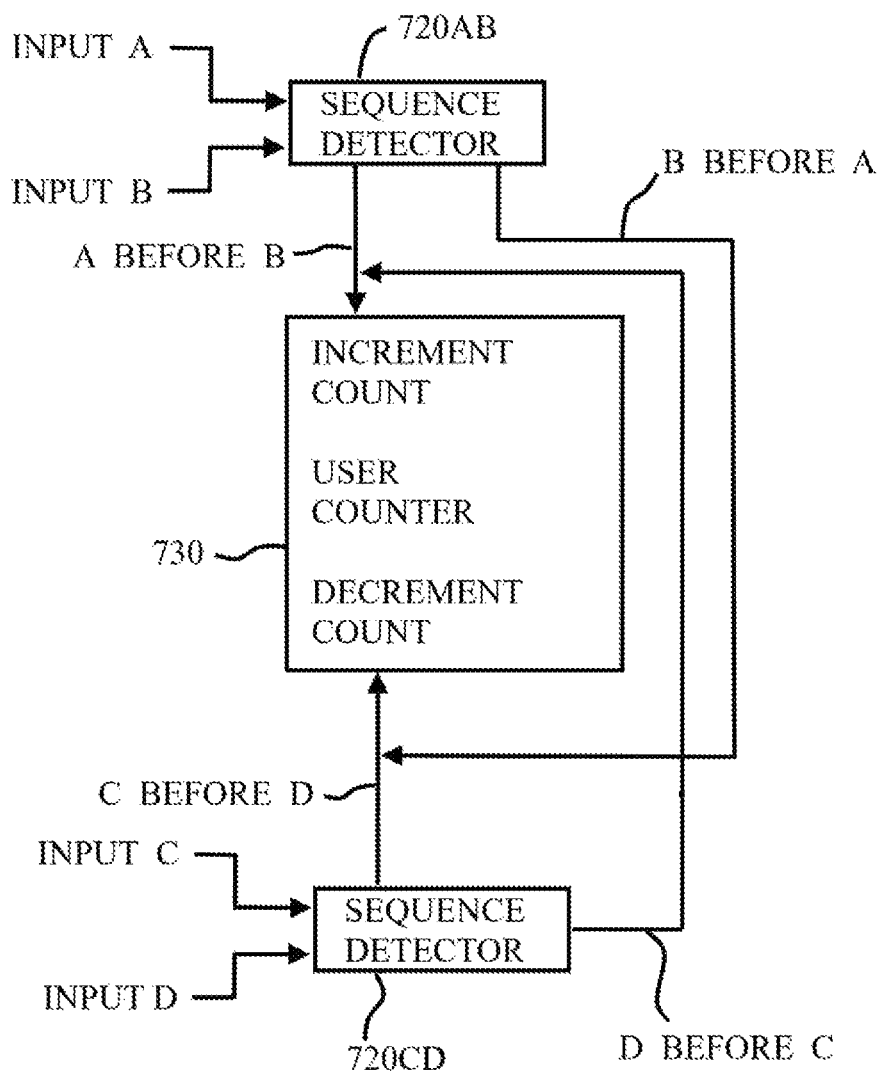
FIG. 8 is a simplified schematic block diagram showing an illustrative embodiment of how some signals produced by elements of the type shown in FIG. 7 may be used in accordance with further possible features of the invention.

FIGS. 7 and 8 show illustrative ways in which the number of users in artificial cave passage 10 may be monitored to keep track of the number of users currently in the passage. FIG. 7 shows two break-beam user sensors at or near representative cave entrance 13. The first of these sensors includes light source A (702A) and light detector A (704A). Detector 704A normally receives light from source 702A. However, when a user begins to enter cave passage 10 via entrance 13, the user must first pass between elements 702A and 704A, thereby interrupting the reception of light by detector 704A. This causes detector 704A to produce an output signal that is identified as "input A" in FIG. 8. Similarly, detector 704B normally receives light from source 702B. But an entering user who has first interrupted the 702A to 704A light path must subsequently pass between elements 702B and 704B, thereby interrupting the reception of light by detector 704B. This causes detector 704B to produce an output signal that is identified as "input B" in FIG. 8.

FIG. 8 shows inputs A and B applied to sequence detector 720AB. This sequence detector circuitry determines whether input A was received before input B (or, alternatively, whether input B was received before input A). If input A was received first, sequence detector 720AB outputs an "A before B" signal, which causes user counter circuitry 730 to increment (increase) its user count by 1 to indicate that a new user has entered artificial cave passage 10. On the other hand, if sequence detector 720AB detects that it has received input B before input A, detector 720AB outputs a "B before A" signal. This causes user counter circuitry 730 to decrement (decrease) its user count by 1 to indicate that a user previously in cave passage 10 has exited via entrance 13.

Returning to FIG. 7, this FIG. shows two more break-beam user sensors at or near the exit 15 from cave passage 10. The first of these user sensors includes light source C (702C) and light detector C (704C). The second of these sensors includes respectively similar elements 702D and 704D. A user exiting the cave via exit 15 must first break the light beam between elements 702C and 704C, and must thereafter break the light beam between elements 702D and 704D. When the 702C to 704C light beam is broken by a user, detector 704C produces the output signal identified as "input C" in FIG. 8. Similarly, when the 702D to 704D light beam is broken by a user, detector 704D produces the output signal identified as "input D" in FIG. 8.

As show in FIG. 8, inputs C and D are applied to sequence detector circuitry 720CD. This circuitry detects which of its two inputs was received first. If input C preceded input D, detector 720CD produces a "C before D" output signal, which causes user counter 730 to decrement its user count by 1 to indicate that a user previously in the cave has now exited the cave via exit 15. On the other hand, if input D preceded input C, detector 720CD produces a "D before C" output, which causes user counter 730 to increment its user count to indicate that a new user has entered artificial cave passage 10 via exit 15.

It will be apparent from the foregoing discussion that although nominally an "entrance", entrance 13 can function generically as either a user entrance or a user exit with the benefit of circuitry of the type shown in FIGS. 7 and 8. Similarly, the FIGS. 7 and 8 circuitry allows "exit 15" to function generically as either a user exit or a user entrance. In other words, the FIGS. 7 and 8 circuitry allows user counter 730 to maintain an accurate, current count of all users who are currently in artificial cave passage 10, regardless of whether any particular user entered via a nominal "entrance 13" or a nominal "exit 15", as well as whether any particular user exited via a nominal "exit 15" or a nominal "entrance 13". Similarly, it will be apparent that artificial cave passage 10 can have any number of other entrances and/or exits (e.g., emergency egress 14 in FIG. 1). Each such other entrance/exit can be equipped with two further break-beam user sensors (like 702A, 704A, 702B, and 704B in FIG. 7). The outputs of those further break-beam sensors can be applied to further sequence detector circuitry like 720AB in FIG. 8. And the outputs of any such further sequence detector circuitry can be used as additional increment/decrement inputs to user counter 730 in FIG. 8. In this way the system can monitor all entrances to and/or exits from artificial cave passage 10 and user counter 730 can determine and maintain an accurate count of the number of users who are present in artificial cave passage at any given time.

Because (as has just been discussed) one or more nominal entrances to and/or exits from the cave passageway 10 may at least sometimes be used for user flow opposite to the "normal" or nominal user flow direction, the term "port" will sometimes be used herein as a generic term for any location along the artificial cave passageway via which a user may (1) enter, (2) exit, or (3) either enter or exit the passageway.

Users entering and/or leaving artificial cave passage 10 can be detected and thereby counted to produce the above-described current user count value by means other than the above-described pairs of break-beam sensors (e.g., 702-704A, B, C, or D shown in FIG. 7). For example, turnstiles that produce an output signal pulse for each user passing through the turnstile can be used. Such turnstiles can be bi-directional, i.e., producing an "increment user count" output signal when operated in one direction (the user-entering direction) and producing a "decrement user count" output signal when operated in the opposite direction (the user-exiting direction). Another example of possible alternatives to pairs of break-beam sensors is a pair or array of pyroelectric infrared (PIR) detectors as shown and described earlier in this specification that can detect both the presence and direction of travel of a user.

Another way of characterizing the above-described user count parameter is as a "net" count of the users. In other words, at any given time the above-described user count parameter registered in user counter circuitry 730 has a net value which is effectively the number of users who have entered cave passage 10 up to that time minus the number of users who have exited the cave passage up to that time.

It will be understood that FIG. 7 shows the actual passage 10 of the artificial cave structure and system only very simply and schematically, and without repeating many of the associated elements that are shown more fully, for example, in earlier FIGS. such as FIG. 1, FIG. 4, FIG. 5, and so on. It will be appreciated, however, that what is shown in FIG. 7 is intended for use with any or all of the artificial cave structures and/or artificial cave system features shown in these other FIGS. and described elsewhere in this specification.

Figure 9:
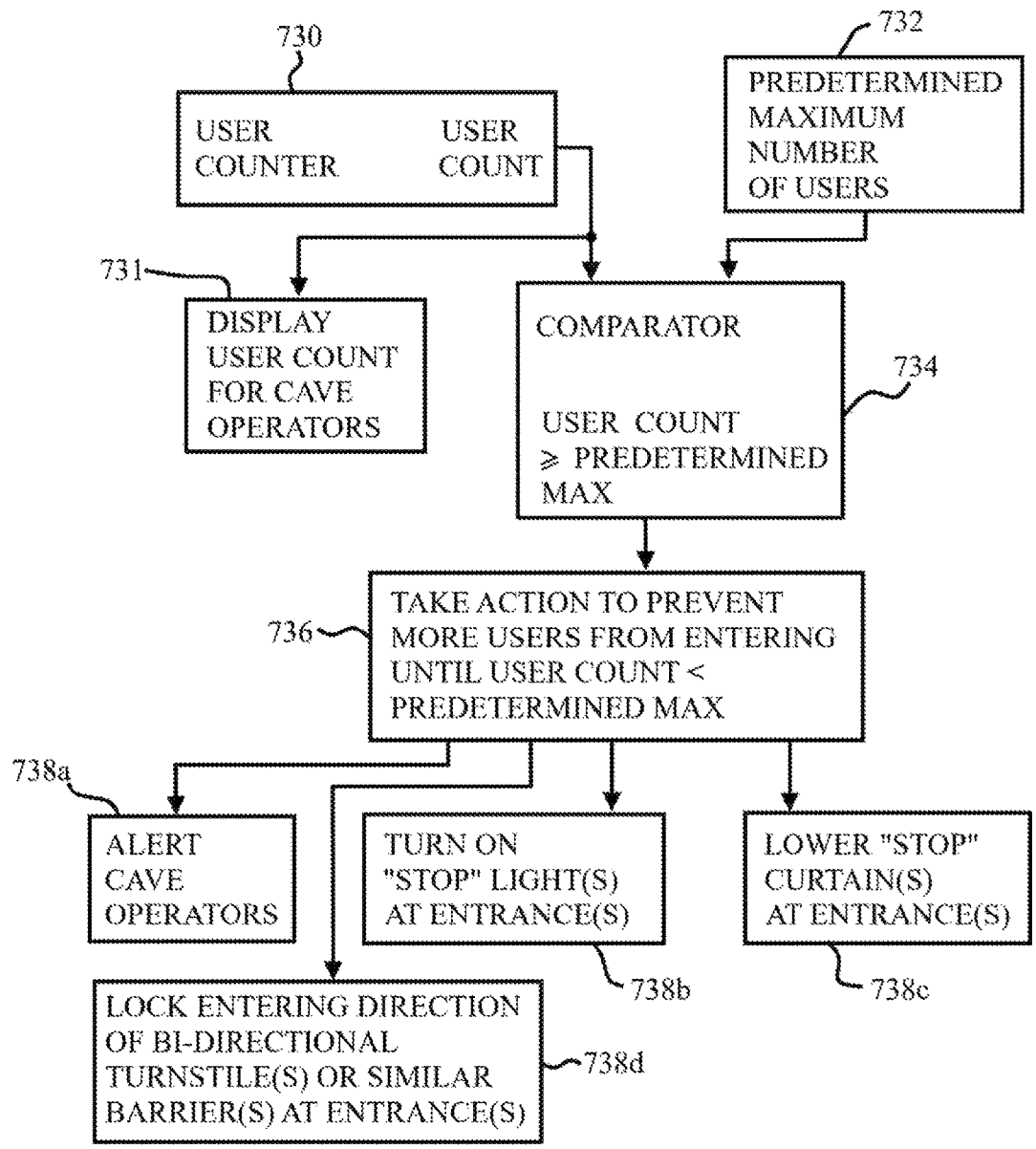
FIG. 9 is another simplified schematic block diagram showing still further development of use of elements like those shown in FIGS. 7 and 8 in accordance with still further possible features of the invention.

FIG. 9 shows several examples of how the above-determined count of users currently in artificial cave passage 10 can be used in accordance with various further principles of the invention. As shown in FIG. 9 a "user count" output signal of user counter circuitry 730 (as in FIG. 8) is applied to comparator circuitry 734. (This "user count" signal is indicative of the current value of the above-described user count parameter registered in circuitry 730.) Another input to comparator circuitry 734 is the output signal of circuitry 732, which indicates a predetermined maximum desired number of users who should be in the cave at any one time. This maximum number may be selected and stored in circuitry 732 when the system is first set up, or it may be a number that can be changed from time to time by the operators of the system. Although this number could be 1 for a relatively small artificial cave, preferably the cave is large enough to accommodate multiple users at any given time, in which case the predetermined maximum number output by circuitry 732 is set to a suitable number greater than 1.

Comparator circuitry 734 performs an on-going comparison between the actual current user count output by user counter 730 and the maximum desired number of simultaneous users output by circuitry 732. Any time that circuitry 734 detects that the actual current user count equals or exceeds the desired maximum number of simultaneous users, circuitry 734 produces a "user count greater than or equal to predetermined max" output signal. This signal is applied to circuitry 736 for taking action appropriate to preventing more users from entering artificial cave passage 10 until comparator 734 subsequently indicates that the actual current user count has fallen below (become less than) the predetermined desired maximum number of simultaneous users of the cave.

Because enforcement of the exact value of the predetermined desired maximum number of simultaneous users output by element 732 in FIG. 9 may not be absolutely necessary in all cases, terms like "approximate" may sometimes be used herein to refer to the comparison performed by comparator circuit 734 (and likewise to the condition monitored by element 736).

Below element 736 in FIG. 9, this FIG. shows several examples of actions that can be initiated by circuitry 736 in response to a "user count greater than or equal to predetermined max" output signal from circuitry 734. One such example is circuitry 738a for alerting the human operators of the cave system to the fact that user capacity has been reached or exceeded. Circuitry 738a may be a computer monitor that may display an appropriate alert message and/or graphic that the system operators can see. Alternatively or in addition, an audio output to the system operators may be generated by a computer that is part of the controls for the system. As an alternative or addition to circuitry 738a, circuitry 738b may automatically turn on a "stop" light (e.g., a red light like the red light of a traffic signal) at or near each entrance (or each entrance/exit) to artificial cave passage 10 to tell additional possible users not to enter the cave at this time. As an alternative or addition to such a "stop" light, circuitry 738c may lower a "stop" curtain over each entrance (or each entrance/exit) to the cave or otherwise position such a curtain across each entrance (or each entrance/exit) to deter or somewhat obstruct additional users from entering the cave. Such a curtain may bear an explanatory "cave full, do not enter at this time" message readable by prospective additional users. Preferably any such curtain is only a "soft" barrier or obstruction to entry that does not impede users currently in the cave from exiting the cave through or past the curtain.

Still another example of an action that may be taken to prevent more users from entering artificial cave passageway 10 when elements 734-736 detect that the number of users already in the cave is at or greater than the desired maximum number is illustrated by element 738d in FIG. 9. Element 738d illustrates a representative turnstile or similar barrier at a representative entrance 13 to or exit 15 from the cave. Turnstile 738d may normally be operable (turnable) in either of two directions to permit a user to either enter the cave by passing through the turnstile in one direction or to exit the cave by passing through the turnstile in the opposite direction. However, when element 736 signals that no more users should be allowed to enter the cave, that signal from element 736 is applied to turnstile 738d to prevent it from turning in the direction that permits any further prospective user of the cave from passing through the turnstile to enter the cave. Users can still exit the cave by passing through turnstile 738d in the opposite direction. The turnstile can return to normal, bi-directional operation when elements 734-736 are no longer indicating that the cave is at maximum user capacity.

The above-described possible turnstile feature or embodiment is an example of how "harder" stops or obstructions 738d may be provided for more strictly ensuring that the acceptable number of simultaneous users of the cave is never exceeded. Each entrance to or exit from cave passageway 10 (e.g., all of the ports 13, 14, and 15 in FIG. 1) may be "controlled" as described above for representative element 738d and/or any other generally similar barrier mechanism having automatically controlled operation like that described for elements 738d.

Another example of possible uses of the user count signal output by user counter 730 is illustrated by element 731 in FIG. 9. This example is a display of the current user count value for observation by the human operators of the artificial cave system. Thus display 731 may appear on (or may be) a computer monitor of the system (similar to or the same as the computer monitor for above-described cave operator alert 738a). Display 731 thus enables the operator of the system to see the number of users currently in the cave at any time during operation of the cave system.

Still more examples of possible uses of the user count output signal of user counter 730 will be discussed later in this specification in connection with FIG. 12.

Figure 10:
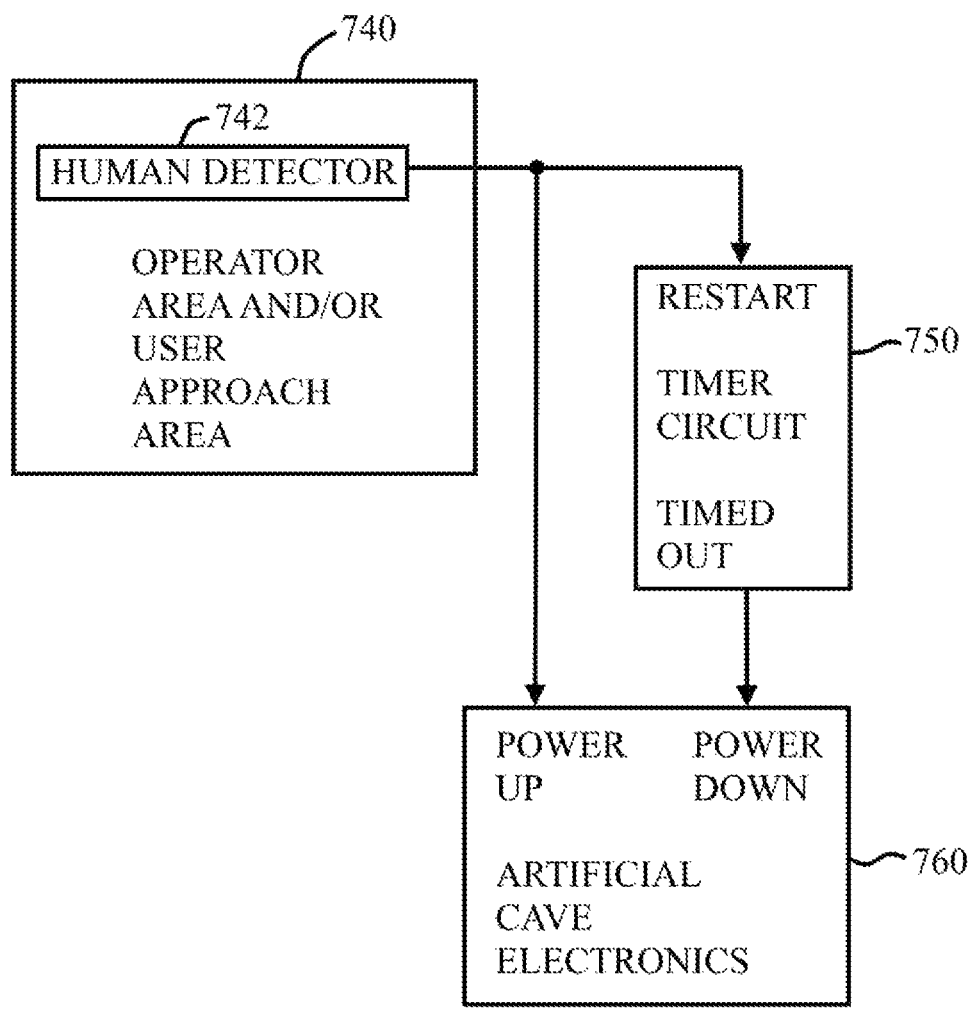
FIG. 10 is a simplified schematic block diagram showing an illustrative embodiment of yet other possible features in accordance with the invention.

FIG. 10 shows an illustrative embodiment of circuitry in accordance with a further possible aspect of the invention for automatically powering down at least portions of the electronic apparatus of the cave system after there has been no human activity associated with the cave for a predetermined relatively long time (e.g., an hour, more or less). Such powering down (analogous to having a computer monitor or computer system go into a relatively low-power "sleep" or "power-saver" mode) can be desirable for a number of reasons. For example, it can reduce overall, average electrical power consumption by the system, thereby lowering its operating cost. It can also help to extend the useful operating life of certain power-consuming circuit elements. Lowering power consumption of the system when it is not in use may also increase the safety of the system, especially while it may not be receiving much (if any) human operator attention.

In the illustrative embodiment shown in FIG. 10 the area at least sometimes occupied by the human operators of the system and/or the area through which potential users of the cave approach the cave to begin to use it (e.g., near cave entrance 13) is an area equipped with one or more sensors or detectors (e.g., 742) for detecting human presence and/or motion in that area or in those areas. "Human presence" may be detected in any of a number of ways. For example, the presence of a human within the detection range of a suitable "human detector" may be detected by the body heat given off by a human Or the presence of a human may change the acoustic characteristics of a given detection area and may therefore be detectable acoustically. A human motion sensor (as in some burglar alarm systems or room light control switches) may be used to detect "human motion." For purposes of this disclosure there is thus a distinction between "human presence detection" or the like and "human motion detection" or the like. As mentioned earlier in this specification, "human detection" or the like is sometimes used herein as a generic term for both "human presence detection" and/or "human motion detection" or the like.

It should be noted that for some purposes herein human detection that at least includes human presence detection may be preferable to human detection that only includes human motion detection. For example human presence detection may be more effective at detecting a person (e.g., a user in cave passageway 10) who has become ill and consequently immobile. On the other hand, human motion detection alone can also be very effective for present purposes.

Still other examples of human detectors usable herein include camera systems, possibly with human image recognition capabilities; audio systems for detecting human breathing, human heartbeats, and/or the human voice; etc. Various alternatives already mentioned, and other alternatives to be mentioned, are further discussed elsewhere in this specification. Thus, for example, PIR detectors, described earlier in this specification, may be used as human detectors, and may be (illustratively) like the motion sensors in some room lighting switches that are used to automatically turn on the lights in a room whenever a person enters the room. Again however, it will be understood that any other suitable type of human presence and/or motion detectors can be substituted for or added to PIR detectors for implementation of human detector 742 in FIG. 10 if desired. The same is true for any other human detector shown and described herein (e.g., human detectors 710-1 through 710-N in FIGS. 7, 11, and 12). Examples of yet other possibly suitable sensors for detecting human presence and/or motion include visible- and/or infrared-light-detecting cameras connected to computers operating face- and/or body-shape recognition software, MEMS thermal sensors, and microphones connected to computers operating human voice recognition software.

Returning again specifically to FIG. 10, whenever human detector 742 detects human presence and/or motion within the detection area(s) covered by the detector, it produces an output signal pulse that is applied to the "restart" input terminal of timer circuit 750. Any such restart pulse causes timer circuit 750 to return to an initial state from which it begins to measure the amount of time that has passed (elapsed) since it was last restarted. Whenever timer circuit 750 reaches a predetermined desired maximum amount of elapsed time since it was last restarted, circuit 750 produces an output signal pulse on its "timed out" output lead.

The "timed out" output signal of timer circuit 750 is applied to the "power down" input terminal of artificial cave electronics 760 (e.g., at least some of the electronic cave circuit elements, systems, and/or subsystems shown, for example, in FIGS. 1, 3-6, and so on). When a "timed out" output signal from timer 750 is thus applied to the "power down" input terminal of cave electronics 760, these cave electronics respond by automatically going into a relatively low-power "sleep" mode. In such a mode the artificial cave system is not capable of supporting normal human-user use of the cave. However, the cave system now consumes less electrical power, the useful life of at least some of the system's components may be usefully extended by being temporarily unpowered or only low-powered, and the system has other "green" attributes and benefits.

FIG. 10 shows that in addition to restarting timer circuitry 750, any output pulse produced by human detector 742 (indicating detection of human activity (presence and/or motion) in the detection area(s) covered by detector 742) can also be applied to the "power up" input terminal of artificial cave electronics 760. Receipt of such a human-detection signal from human detector 742 via its "power up" input terminal causes cave electronic circuitry 760 to automatically return to its full-power, normal operation mode in which it is ready to receive human users into cave passage 10 and to otherwise deal with such users in the various ways that are described elsewhere in this specification.

It will be understood that such automatically triggered powering up as has just been described is optional. It may be desired, for example, to instead require a human operator of the system to perform some specific "manual" operation to re-power the system after it has gone into "power down," "sleep", or "power saver" mode. This may help to ensure, for example, that both the system and its human operators are ready for the reception of human users into the cave system.

Figure 11:
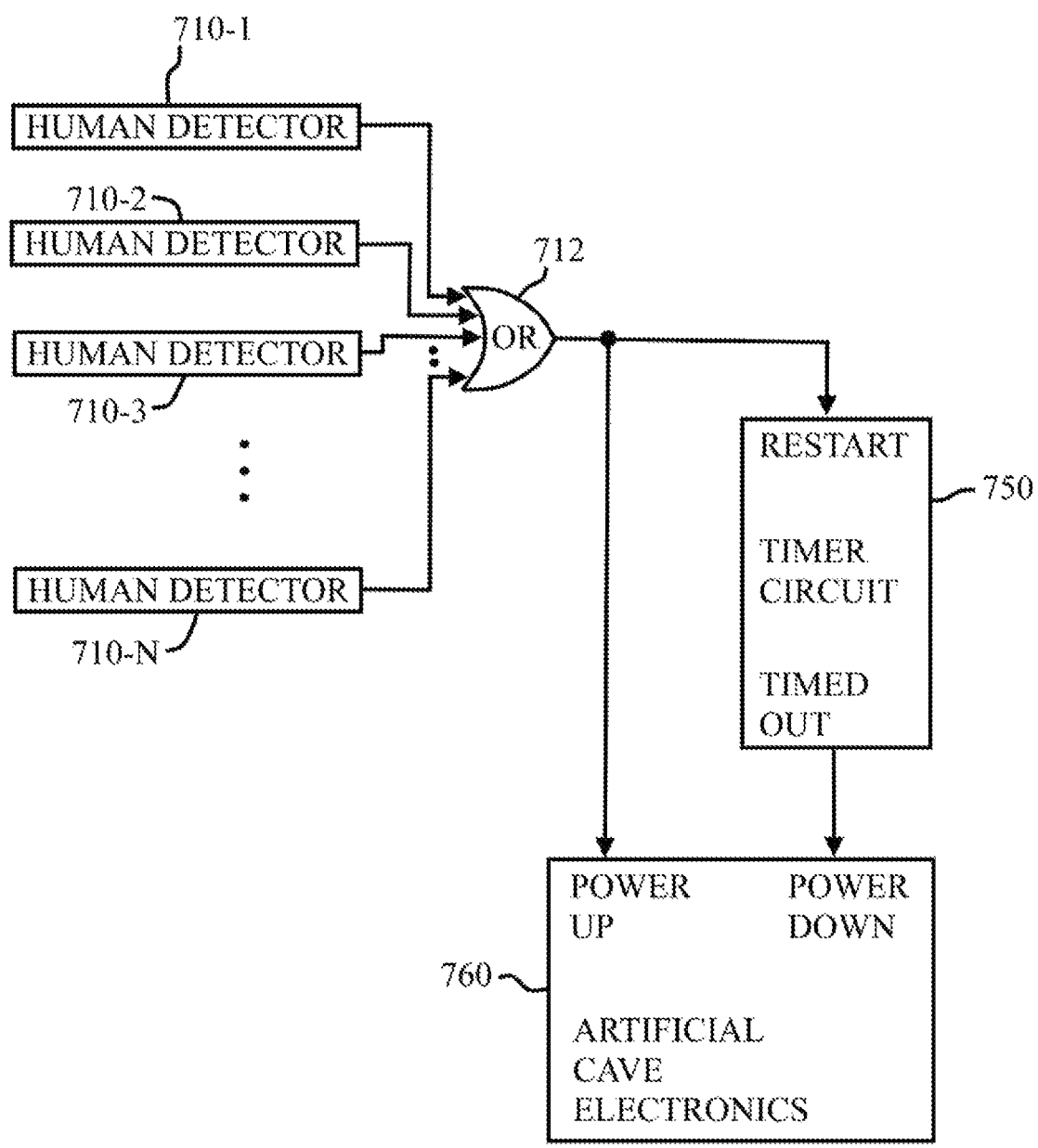
FIG. 11 is another simplified schematic block diagram that shows an alternative embodiment of the type of elements that are shown in FIG. 10 in accordance with the invention.

FIG. 11 (in conjunction with a previously undiscussed aspect of FIG. 7) shows another example of how it may be determined when it is appropriate to automatically cause artificial cave electronics 760 to go into "power down", "energy saver", or the like mode. As shown in FIG. 7 any number of human detectors 710-1 through 710-N for detecting human activity (presence and/or motion) may be provided at any of a number of locations along cave passage 10 (including any of its various possible branches). Again, solely for convenience and brevity of reference herein, all such human presence and/or motion detectors or sensors 710 will sometimes be referred to herein as human detectors or the like. It will be understood that (as in the case of detectors 742 in FIG. 10) detectors 710 can be PIR detectors or any other suitable detectors or sensors for human presence and/or motion in the "detection area" of each sensor. Preferably human detectors 710 are distributed throughout cave passage 10 (including any branches that the passage may have) so that, taken together (i.e., collectively), the detection areas of all detectors 710 cover at least a substantial portion (more preferably most or all) of the extent of passage 10. In this way human detectors 710 can collectively detect human presence and/or motion anywhere throughout at least a major portion (and most preferably most or all) of artificial cave passage 10.

In FIG. 11 the output signals of human detectors 710-1 through 710-N are applied, respectively, to the N input terminals of logical OR gate 712. Thus, if any one or more of human detectors 710 is producing an output signal indicating detection of human presence and/or motion in that detector's detection area, OR gate 712 passes that signal on to the "restart" input terminal of timer circuit 750 (which can be the same as timer circuit 750 in FIG. 10). Accordingly, timer circuit 750 is restarted and prevented from reaching its "timed out" time as long as there is sufficiently frequent human presence and/or motion detected in cave passage 10 by any of detectors 710.

Only after none of human detectors 710 have detected a human within the time allowed by timer circuit 750 is that circuit able to reach its "timed out" condition. When that occurs, timer circuit 750 applies its "timed out" output signal pulse to the "power down" input of artificial cave electronics 760. This causes cave electronics 760 to automatically go into "power down" mode exactly as described above for the same electronics 760 shown in FIG. 10.

Also similar to above-described FIG. 10, the output signal of OR gate 712 can be additionally applied to the "power up" input terminal of artificial cave electronics 760 in FIG. 11 to automatically restore electronics 760 to full power mode when any of human detectors 710 detects human presence and/or motion in cave passage 10. Alternatively (and again as discussed above in relation to FIG. 10) such automatically initiated power-up of electronics 760 can be omitted if desired, and manual power-up by a human operator of the system can be required instead.

Figure 12:
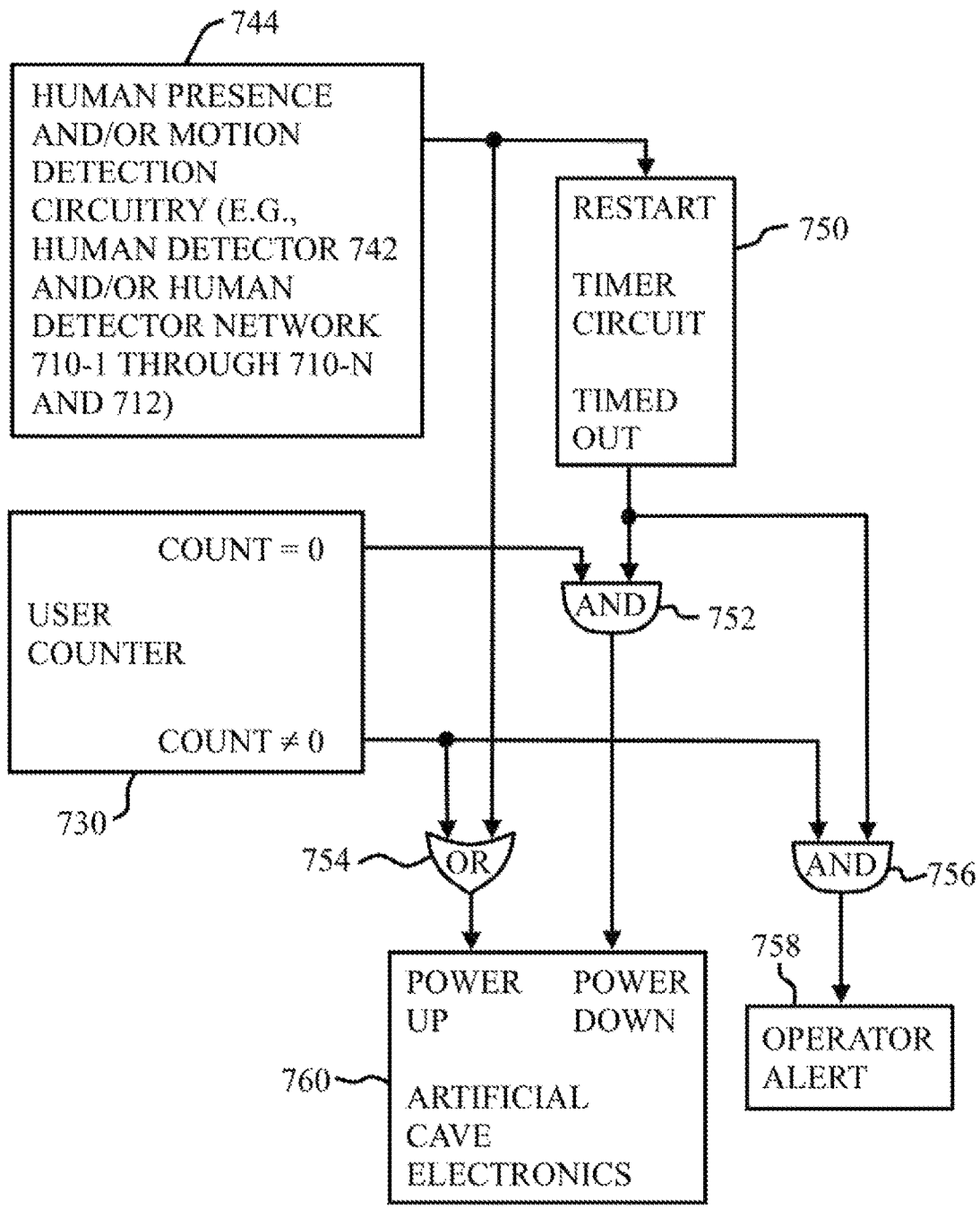
FIG. 12 is a simplified schematic block diagram showing an illustrative embodiment of how certain features from FIGS. 7-11 may be combined and further extended in accordance with yet other possible aspects of the invention.

FIG. 12 shows an illustrative embodiment of the system in which automatic power-down of artificial cave electronics 760 (as in either FIG. 10 or FIG. 11) is conditioned on both (1) a sufficiently long period of elapsed time with no human activity detected as in either FIG. 10 or FIG. 11, and (2) an appropriate current user count value (determined as discussed in detail above in relation to FIGS. 7-9).

In FIG. 12 element 744 can correspond to elements like 740 and 742 in FIG. 10, or to elements like 710 and 712 in FIGS. 7 and 11, or it can be any other components for detecting human activity wherever it is desired to perform such detection. Also in FIG. 12 element 750 can correspond to timer circuit 750 in FIG. 10 or 11, and element 730 can correspond to user counter 730 in FIG. 8 or 9.

In FIG. 12 user counter 730 produces a logical high (e.g., logical 1) output signal on its "count=0" output signal lead whenever it is registering a user count value of zero. Such a zero user count value in user counter 730 also causes counter 730 to output a logical low (e.g., logical 0) output signal on its "count not equal to 0" output signal lead. Conversely, whenever the user count value in user counter 730 is not zero, counter 730 outputs a logical 0 output signal on its "count=0" output signal lead, and counter 730 outputs a logical 1 output signal on its "count not equal to 0" output signal lead.

The "count=0" output signal of counter 730 is applied to one input terminal of logical AND gate 752. The "timed out" output signal of timer circuit 750 is applied to the other input to AND gate 752. (It is assumed here that the "timed out" output signal of timer 750 is logical 0 until timer 750 reaches its timed out condition, at which time timer 750 switches its "timed out" signal from logical 0 to logical 1. It is also assumed here that a logical 1 signal must be applied to the "power down" input terminal of artificial cave electronics 760 in order to cause those electronics to automatically power down.) The output signal of AND gate 752 is applied to the "power down" input terminal of artificial cave electronics 760. This AND gate 752 output signal is logical 1 (causing electronics 760 to power down) only when both of the inputs to AND gate 752 are logical 1. Thus AND gate 752 requires two preconditions to be satisfied or met before allowing automatic power-down of circuitry 760 to take place. These two preconditions are (1) the current user count value (in counter 730) is zero (indicating that no user is currently in artificial cave passage 10) and (2) there has been no human presence and/or motion anywhere in the detection area covered by circuits 744 for at least the length of time required for timer circuit 750 to reach its "timed out" condition.

By requiring the above-described two preconditions to be met or satisfied before causing circuitry 760 to automatically power down, the system is kept at full power while, for example, the human operators of the system can investigate why the non-zero user count value indicates that a user may still be in artificial cave passage 10 although no human motion or presence has been recently detected in the cave. This can help the operators to check for the possibility of an ill, injured, or incapacitated user in the cave while the cave electronics are all still kept at full power and in full operational mode. This can also enhance the suitability of human detectors 710 and/or 742 that are only human motion detectors, which can be more economical to implement than human presence detectors. This is so because user counter 730 effectively provides some human presence information in the FIG. 12 system.

To help alert the human operators of the cave to the apparent anomaly of no recent activity in the cave passage 10 coupled with a non-zero user count value in counter 730, the "timed out" output signal of timer circuit 750 is applied to one input terminal of AND gate 756 in FIG. 12, while the "count not equal to 0" output signal of user counter 730 is applied to the other input terminal of that gate. AND gate 756 thus produces a logical 1 output signal when timer 750 times out but counter 730 fails to indicate zero as the number of users currently in cave passage 10. A logical 1 output signal from AND gate 756 causes operator alert component 758 to output an alert (e.g., visible on a computer monitor or other warning light and/or audible via computer speakers or other audio equipment) to the human operators of the system. Such an operator alert advises the operators to ensure that no user is still in artificial cave passage 10 before allowing the system to shut down.

A final aspect of what is shown in FIG. 12 is logical OR gate 754. The two inputs to this gate are (1) the "count not equal to 0" output signal of counter 730 and (2) the output signal of detector circuitry 744 (assumed to be logical 1 whenever detector circuitry 744 detects human presence and/or motion within its detection range). The output signal of OR gate 754 is applied to the "power up" input terminal of circuitry 760. (Again it is assumed here that a logical 1 "power up" input signal causes cave electronics 760 to power up or to remain powered up.) Circuitry 760 may be constructed to give preference to any "power up" input signal over any "power down" input signal. In this way, for example, the system will not power down as long as counter 730 indicates a non-zero user count.

As in earlier-described embodiments, once the system has automatically powered down, it may be preferred to require a human operator to manually power the system up again.

Features of the invention like those discussed above especially in connection with FIGS. 7-12 can have particular importance because, to realistically emulate natural cave conditions, an artificial cave passage 10 should (1) be very or even completely dark, (2) preferably include at least some areas that require a human user to crawl and otherwise squeeze through relatively tight or constricted passageways, (3) have a number of horizontal and/or vertical twists and turns (i.e., a non-linear alignment), and (4) have artificial speleothems, some of which project into the user passageway and some of which might snag a user if not avoided appropriately. Also to realistically emulate a natural cave an artificial cave may have sudden or "unexpected" drops, and/or may require that a user climb up or down a steep or even vertical cave wall. Still other natural-cave-emulating features may be the inclusion of multiple alternative pathways through the artificial cave. Just like a real cave, some of the features that may be built into an artificial cave may thus be challenging, confusing, or even somewhat disorienting for some users. These requirements for or characteristics of artificial caves in accordance with this invention may make it difficult or impossible for the operators of these caves to directly observe users as they proceed through the cave. For example, the typical non-linear alignment of artificial cave passageway 10 obscures at least some portions of the passageway from other portions of the passageway. Especially, some portions of the passageway are thus typically not visible from outside any entrance 13 or exit 15.

Again, the cave interior is dark, the pathways through the cave are not straight but rather tortuous with a number of confined (e.g., user-crawl-requiring) areas, and there may even multiple alternate pathways through. Because direct observation of users in the cave is thus difficult or impossible, it can be important to provide alternate means of making sure that all users make it through the cave successfully and in a reasonable amount of time. Video camera systems in the cave that rely on light frequencies that are invisible to users and that therefore do not interfere with a user's perception of the cave as naturally dark can be used. But to be fully effective the video monitors of such camera systems may require constant or at least frequent observation by the human operators of the cave. Such camera systems may also be relatively expensive and they may not provide the information needed to automatically prevent too many users from entering the cave at one time. For all of the foregoing reasons there is a need for artificial cave system features like those discussed above particularly in connection with FIGS. 7-12.

In addition to the possible system aspects that are illustrated, for example, by above-described FIGS. 7-12, it will be appreciated that these (and other FIGS. herein) also serve to illustrate methods of operating such possible system aspects in accordance with the invention. Thus, for example, these FIGS. inherently show what method functions are performed by the various depicted system elements and how these individual method functions interact with one another to produce full methods for achieving various desired results.

What is claimed is:

1. An artificial cave system comprising:
   an artificial cave passageway configured to emulate the interior of a natural underground cave by being dark, and having a non-linear alignment that obscures at least some portion of the passageway from at least some other portions of the passageway, the passageway further including one or more ports whereby users can enter and exit the passageway;
   a plurality of human detectors, each of which detects any human in a respective one of a plurality of detection areas in the passageway, the detection areas being distributed throughout the passageway so that collectively the detection areas cover at least most of the passageway;
   means for monitoring human-detection-indicating output signals of the human detectors and for producing a power-down output signal when none of the human detectors have detected any human in any of their respective detection areas for at least a predetermined time interval; and
   means for automatically reducing electrical power consumption by at least some electronic components of the system in response to the power-down signal.

2. The system defined in claim 1 further comprising:
   means for counting users entering and exiting the passageway to produce a net count of how many users are currently in the passageway at any given time; and
   means for preventing operation of the means for automatically reducing electrical power consumption whenever the net count of users currently in the passageway is not zero.

3. The system defined in claim 2 further comprising:
   means for alerting a human operator of the system whenever the means for automatically reducing electrical power consumption attempts to reduce said electrical power consumption but is prevented from doing so by the means for preventing because the net count of users currently in the passageway is not zero.

4. The system defined in claim 1 further comprising:
   first means for counting users entering the passageway to produce a first count;
   second means for counting users exiting the passageway to produce a second count;
   means for comparing a net user count, which is the first count reduced by the second count, to a predetermined maximum desired number of users in the passageway;
   means for displaying the net user count to a human operator of the system; and
   means for advising additional prospective users not to enter the passageway when the net user count is approximately equal to the predetermined maximum desired number.

5. The system defined in claim 4 wherein the maximum desired number is greater than 1.

6. The system defined in claim 4 wherein the means for advising comprises:
   means for displaying a visible stop indication adjacent to at least one port through which additional prospective users may want to enter the passageway.

7. The system defined in claim 4 wherein the means for advising comprises:
   means for positioning an obstruction across at least one port through which additional prospective users may want to enter the passageway.

8. The system defined in claim 4 further comprising:
   means for alerting a human operator of the system when the net user count is approximately equal to the predetermined maximum desired number.

9. The system defined in claim 4 further comprising:
   an additional human detector for detecting any human in a system operator area entered by a human operator of the system, wherein the additional human detector is included among the human detectors monitored by the means for monitoring so that production of the power-down output signal also requires that the additional human detector not have detected a human for at least the predetermined time interval.

10. The system defined in claim 9 wherein the means for automatically reducing power consumption also requires the net user count to be zero before operating to reduce said power consumption.

11. The system defined in claim 10 further comprising:
    means for alerting a human operator of the system in the event that the net user count is not zero when the means for automatically reducing power consumption would otherwise operate to reduce said power consumption.

12. A method of operating an artificial cave system that includes an artificial cave passageway configured to emulate the interior of a natural underground cave by being dark, and having a non-linear alignment that obscures at least some portions of the passageway from at least some other portions of the passageway, the method comprising:
  counting users entering and exiting the passageway to determine a net count of how many users are currently in the passageway at any given time;
  detecting any human in at least a portion of the passageway;
  determining the amount of time that has elapsed since the detecting most recently detected any human;
  reducing electrical power consumption of at least some electronic components of the system after the amount of time has reached a predetermined amount of time; and
  preventing performance of the reducing if the net count is not zero when the reducing would otherwise be performed.

13. The method defined in claim 12 further comprising:
  alerting a human operator of the system whenever the preventing occurs.

14. The method defined in claim 12 further comprising:
  comparing the net count to a predetermined desired maximum number of simultaneous users of the passageway; and
  indicating to additional prospective users of the passageway that they should not enter the passageway whenever the net count is approximately equal to the desired maximum number.

15. The method defined in claim 14 wherein the indicating comprises:
  displaying a visible indication that a prospective user should not enter the passageway adjacent at least one port through which a prospective user might otherwise enter the passageway.

16. The method defined in claim 15 wherein the displaying comprises:
  placing an obstruction across at least one port through which a prospective user might otherwise enter the passageway.

17. The method defined in claim 14 further comprising:
  providing an alert to a human operator of the system whenever the net count is approximately equal to the desired maximum number.

18. A method of operating an artificial cave system that includes an artificial cave passageway configured to emulate the interior of a natural underground cave by having a non-linear alignment that obscures at least some portions of the passageway from at least some other portions of the passageway, said portions of the passageway collectively constituting at least most of the passageway, the method comprising:
  separately detecting any human in each of said portions of the passageway to produce a separate human detection signal for each of said portions of the passageway;
  determining the amount of time that has elapsed since none of the human detection signals indicated detection of a human in respective portions of the passageway; and
  reducing electrical power consumption of at least some electronic components of the system after said amount of time has reached a predetermined amount of time.

19. The method defined in claim 18 wherein the artificial cave system further includes one or more ports whereby users can enter and exit the passageway, and wherein the method further comprises:
  counting users who are entering the passageway to produce a user count;
  reducing the user count for users exiting the passageway; and
  preventing the reducing electrical power consumption unless the user count is zero when the reducing electrical power consumption would otherwise be performed.

* * * * *